(12) United States Patent
Kubomura et al.

(10) Patent No.: US 6,968,502 B1
(45) Date of Patent: Nov. 22, 2005

(54) INFORMATION PROCESSING APPARATUS FOR DISPLAYING ENLARGED CHARACTERS OR IMAGES

(75) Inventors: Keisuke Kubomura, Matsumoto (JP); Junichi Iizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 810 days.

(21) Appl. No.: 08/938,706

(22) Filed: Sep. 26, 1997

(30) Foreign Application Priority Data

Sep. 30, 1996 (JP) .............................. 8-258969
Jun. 9, 1997 (JP) .............................. 9-150531

(51) Int. Cl.$^7$ ................................ G06F 7/00
(52) U.S. Cl. ............ 715/520; 715/526; 715/802; 345/472
(58) Field of Search .................. 715/517–520, 715/802, 526; 345/472, 660, 439, 803, 802; 707/517, 518, 519

(56) References Cited

U.S. PATENT DOCUMENTS

| | | | | |
|---|---|---|---|---|
| 4,893,258 A | * | 1/1990 | Sakuragi | 345/439 |
| 5,001,697 A | * | 3/1991 | Torres | 707/542 |
| 5,073,771 A | * | 12/1991 | Satta et al. | 345/127 |
| 5,142,669 A | * | 8/1992 | Inoue et al. | 345/341 |

(Continued)

FOREIGN PATENT DOCUMENTS

| | | |
|---|---|---|
| EP | 0 327 781 | 8/1989 |
| JP | 3-70068 | 3/1991 |

OTHER PUBLICATIONS

WordPerfect 5.1 screendumps, 1991, Fig. 1–2.*
10 Minute Guide to Windows 3.1, Barnes, k., Alpha Books, 1992, p. 116–117.*
"Dynamic Optimal Window Sizing", IBM Technical Disclosure Bulletin, vol. 37, No. 1, Jan. 1, 1994, p. 515.
"Electronic Magnifying Glasses", IBM Technical Disclosure Bulletin, vol. 37, No. 3, Mar. 1, 1994, pp. 353–354.
"Enabling Frame Resize Options During OS/2 2.1 View Swapping", IBM Technical Disclosure Bulletin, vol. 37, No. 7, Jul. 1, 1994, pp. 347–348.
Office Action examining European Patent Application No. 97 307 623.5, dated Dec. 14, 2001.

*Primary Examiner*—Cesar B Paula
(74) *Attorney, Agent, or Firm*—Staas & Halsey LLP

(57) ABSTRACT

An information processing apparatus having the function of displaying at least a character in an enlarged form and having the contents of display thereof being easily recognizable. A character at an intended point is displayed in an enlarged form according to a designated magnification rate on a screen of a display unit, and an intended area is newly opened according to the intended point and displayed in an enlarged form. Determining whether a request for opening the intended area is issued is then detected. When such a request is detected, the designated magnification rate is changed on the basis of the prior designated magnification rate, the size of the intended area on the screen with the magnification rate of unity, and the size assigned to the intended area to be enlarged on the screen. The intended area is then enlarged and displayed on a display unit in accordance with the determined magnification rate while at the same time displaying the character in the intended area in an enlarged form on the display unit.

70 Claims, 19 Drawing Sheets

U.S. PATENT DOCUMENTS

| | | | | |
|---|---|---|---|---|
| 5,187,776 A | * | 2/1993 | Yanker | 345/341 |
| 5,333,247 A | * | 7/1994 | Gest et al. | 395/138 |
| 5,341,466 A | * | 8/1994 | Perlin et al. | 345/439 |
| 5,485,563 A | * | 1/1996 | Fisher | 345/439 |
| 5,500,922 A | * | 3/1996 | Shimura et al. | 395/110 |
| 5,513,342 A | * | 4/1996 | Leong et al. | 345/798 |
| 5,515,081 A | | 5/1996 | Vasilik | 345/509 |
| 5,544,288 A | * | 8/1996 | Morgan et al. | 345/801 |
| 5,634,064 A | * | 5/1997 | Warnock et al. | 707/513 |
| 5,670,984 A | * | 9/1997 | Robertson et al. | 345/425 |
| 5,671,378 A | * | 9/1997 | Acker et al. | 345/801 |
| 5,684,969 A | * | 11/1997 | Ishida | 345/342 |
| 5,751,283 A | * | 5/1998 | Smith | 345/798 |
| 5,754,873 A | * | 5/1998 | Nolan | 707/527 |
| 5,781,785 A | * | 7/1998 | Rowe et al. | 707/513 |
| 5,877,761 A | * | 3/1999 | Shoji et al. | 345/341 |
| 5,943,679 A | * | 8/1999 | Niles et al. | 707/526 |
| 6,016,155 A | * | 1/2000 | Hiraike | 345/468 |

* cited by examiner

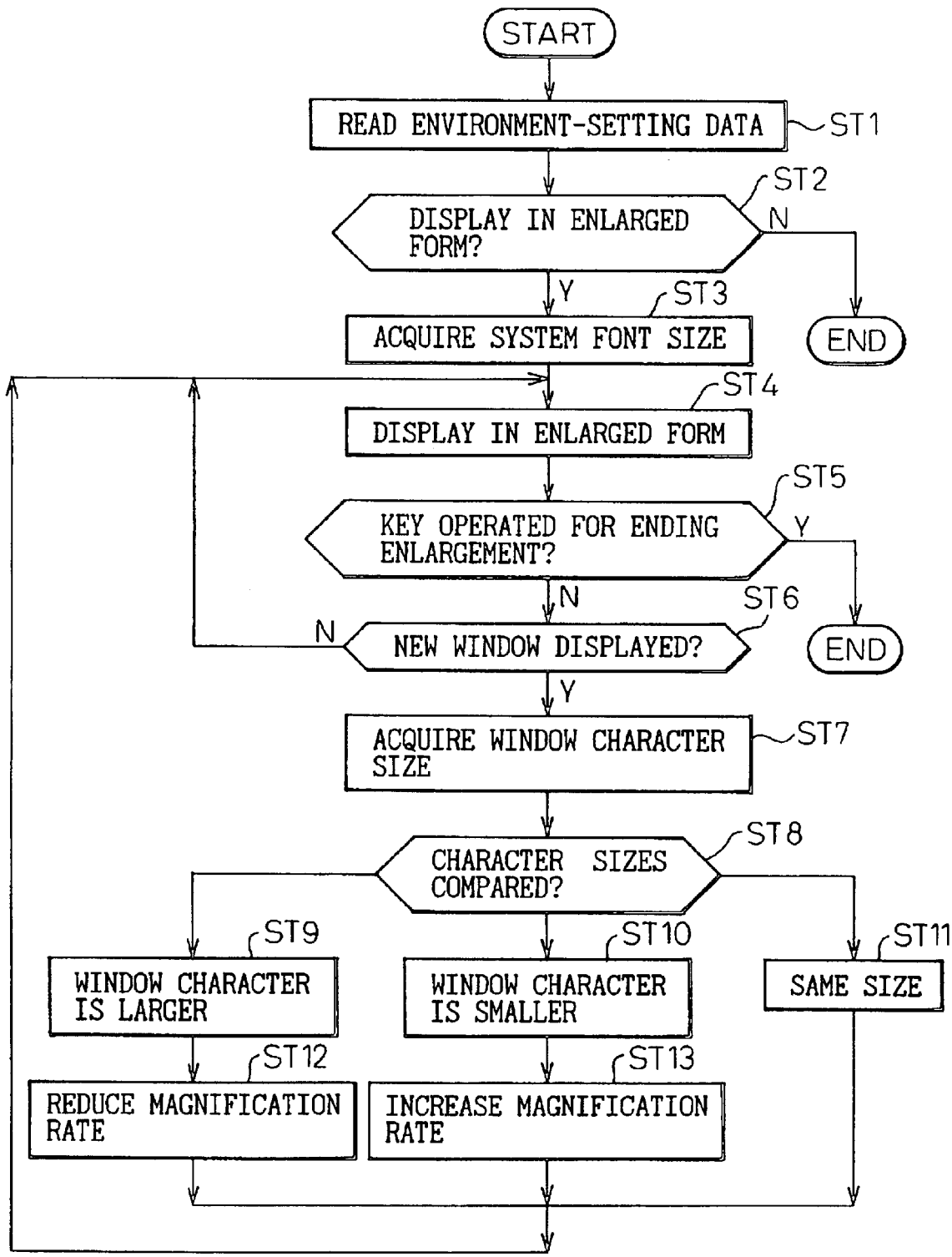

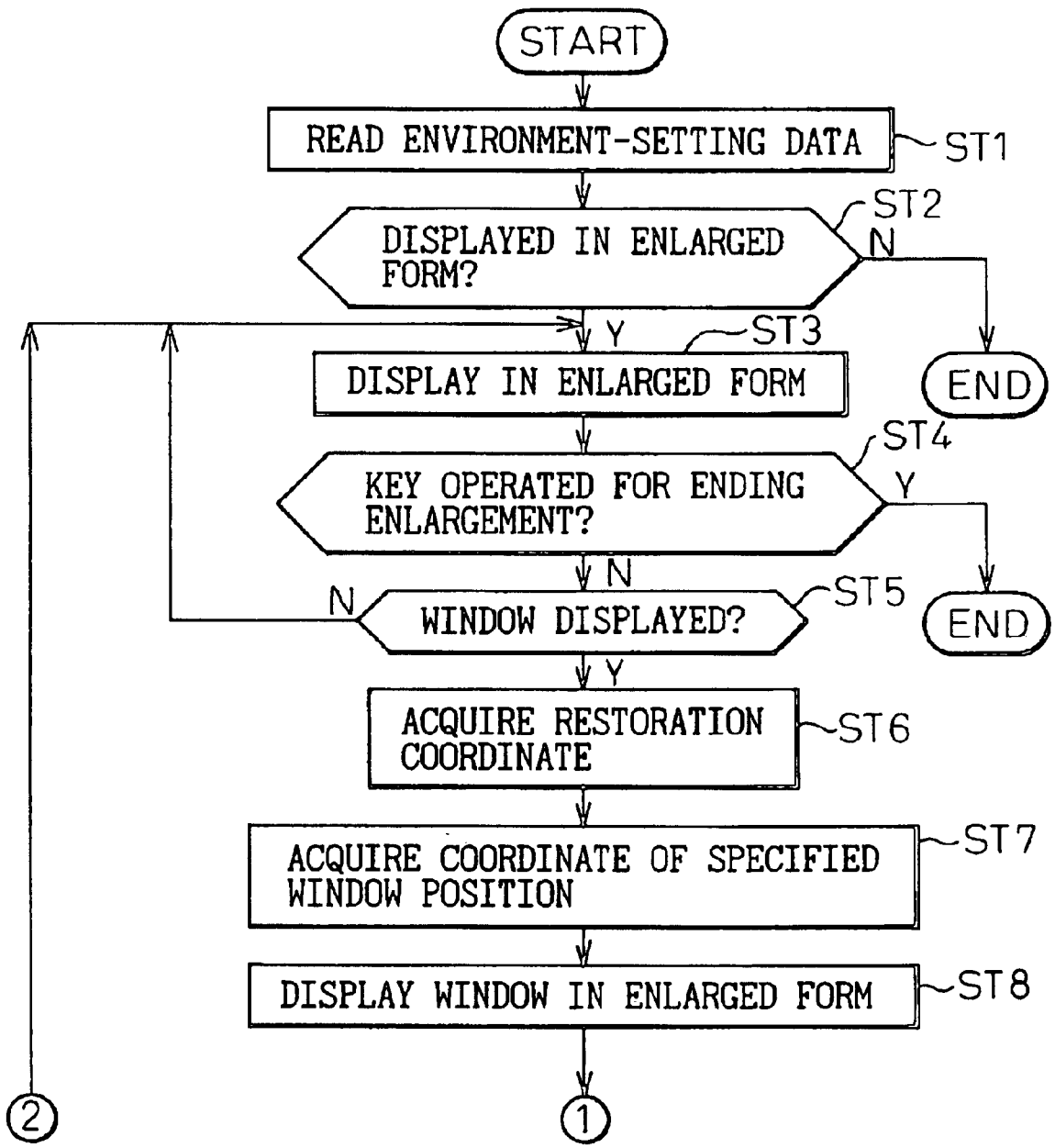

NORMAL DISPLAY

NORMAL DISPLAY

NORMAL DISPLAY

ENLARGED DISPLAY

ENLARGED DISPLAY

ENLARGED DISPLAY

INFORMATION PROCESSING APPARATUS FOR DISPLAYING ENLARGED CHARACTERS OR IMAGES

BACKGROUND OF THE INVENTION

1. Field of the Invention

The present invention relates to an information processing apparatus having the function of displaying a character in an enlarged form, and a program storage medium for storing a program used for realizing it or, in particular, to an information processing apparatus capable of easily visualizing the display contents and a program storage medium for storing the program used for realizing it.

2. Description of the Related Art

In recent years, information processing apparatuses as personal computers and word processors have become widely used even by visually-handicapped persons and aged persons. These users often complain that the characters and pictures on the screen are so small that they cannot be easily seen. The demand for an increased size of characters and pictures on display is thus increasing.

With this situation as a background, software for displaying a normal screen in an enlarged form has been put into practice. The mere enlarged display on the screen, however, is accompanied by a difficulty in visualizing the overall layout due to the insufficient amount of data that is displayed. In view of this, in order to assure operating ease, a configuration is required whereby information on the normal screen can be easily visualized even in an enlarged display area on the screen.

In the case where a window is opened while the characters on the screen are being enlarged at a designated magnification rate in the conventional information processing apparatuses, the particular window is enlarged and displayed at the same magnification rate as the screen.

When scrolling is requested of the window displayed in an enlarged form this way, the window is scrolled according to the same scrolling process as before enlargement.

After completion of a process to display the window in an enlarged form, a request for erasure, if any, is met by erasing the window on the screen as of the time of the request.

The above-mentioned conventional apparatuses pose the problem that the user cannot recognize the contents of the display easily. The problem will be specifically described below.

In an information processing apparatus, a window (dialog box) may be displayed in response to entry of a character in a normal form, that is in a not enlarged form, as shown in FIGS. 13A, 13B.

In such a case, the conventional configuration shown in FIG. 14A for displaying a window at the same magnification rate as at the time of character entry sometimes undesirably causes only a portion of each character to be displayed within the window, as shown in FIG. 14B.

When a character is entered, it is enough to recognize only the neighborhood of the character. In the case of displaying a window, on the other hand, it would be more convenient if the contents displayed in the window could be recognized. The problem of the prior art, however, is that what is displayed in the window cannot be easily recognized by the user.

Also, an information processing apparatus may display a window having a character considerably smaller in size than the character entered for display without any enlargement.

The conventional configuration for displaying a window at the same magnification rate as a character entered encounters the problem that each character in the window is still small and hard to view, even after the window is enlarged as shown in FIG. 15B, when the user is desirous of viewing the screen enlarged at the character magnification rate as shown in FIG. 15A.

Further, in the conventional configurations which handles a request for scrolling a window displayed in an enlarged form by the same scrolling process as before enlargement as shown in FIGS. 16A to 16E, the user may erroneously continue to scroll out of the window as shown in FIG. 16E. In such a case, the user is required to search for the window by manual operation. Because of the whole image of an enlarged display on a screen is difficult to visualize, this manual operation becomes very troublesome. Also, assume that a request for erasing a window is issued after the required process is complete on the window displayed in an enlarged form as shown in FIGS. 17A to 17C. The configuration of erasing the window on the screen as of the time of the request poses no problem when the window is not enlarged as the user can restore the original screen to coincide with the original working screen, as shown in FIG. 17C. In the case where the window is displayed in an enlarged form as shown in FIGS. 18A to 18C, however, the user is unable to restore the original working screen as shown in FIG. 18C. The user is thus required to restore the original display condition by very troublesome manual work.

As described above, the conventional information processing apparatuses have the problem that the user cannot easily recognize the contents displayed in an enlarged form.

SUMMARY OF THE INVENTION

The present invention has been developed in view of this situation, and the object of the invention is to provide a novel information processing apparatus having the function of enlarging characters on a display and which allows the user to easily recognize the display contents, and a novel storage medium for storing a program for realizing such an apparatus.

FIG. 1 is a diagram showing a basic configuration of the present invention.

In FIG. 1, reference numeral 1 designates an information processing apparatus comprising a computer as a main component for displaying a character at an intended point in a form enlarged according to a designated magnification rate on a display screen and, in response to the character at the intended point, opening an intended area (window) anew and displaying it in an enlarged form on the display screen, numeral 2 designates a display unit for the information processing apparatus 1, and numeral 3 an input unit for the information processing apparatus 1.

The information processing apparatus 1 according to this invention comprises input/output control means 10, management means 11, enlarged display means 12, detection means 13, specifying means 14, determining means 15, scroll means 16, second detection means 17, prohibition means 18, storage means 19 and restoration means 20.

The input/output control means 10 executes the process of an interface between the display unit 2 and the input unit 3. The management means 11 manages the data displayed on the display unit 2. The enlarged display means 12 displays the display data managed by the management means 11 in an enlarged form on the display unit 2 in accordance with a designated magnification rate.

The detection means 13 detects whether a request for opening an intended area is issued or not. The specifying means 14 specifies the size of the character or image in the intended area as displayed on a screen/or the size of the character at the intended point as displayed on the screen with the magnification rate of unity. The determining means 15 determines the magnification rate applicable to the intended area by changing the magnification rate supplied to the enlarged display means 12.

The scroll means 16 scrolls the intended area displayed in an enlarged form after converting characters to be displayed from the normal size to the enlarged size by the enlarged display means 12, for example. The second detection means 17 is for detecting whether the intended area is converted to the enlarged size by the enlarged display means 12 and displayed as specified in accordance with the scrolling process by the scroll means 16. The prohibition means 18 prohibits the conversion by the enlarged display means 12 and the scrolling process by the scroll means 16.

The storage means 19 stores the coordinates of the character at the intended point which has been a trigger for opening the intended area. The restoration means 20 restores the display condition of the intended area immediately before opening thereof when erasing the intended area developed by the enlarged display means 12.

The functions of the information processing apparatus 1 according to the present invention are specifically realized by a program. This program is supplied from a medium, and loaded in a memory in the information processing apparatus 1. The functions of the invention thus are realized by executing the program stored in memory.

With the information processing apparatus 1 according to this invention configured as described above, upon detection by the detection means 13 that a request for opening an intended area is issued by the operation of the input unit 3 or the like, the specifying means 14 specifies the size of the intended area on the reference screen, and in response to this specification, the determining means 15 determines a magnification rate applicable to the intended area from the size of the specified intended area on the screen and the size of the screen assigned to the intended area, for example, in such a manner that the intended area is filled up in the particular screen.

The enlarged display means 12 displays the intended area in an enlarged form on the display unit 2 while at the same time displaying the enlarged character in the intended area in accordance with the magnification rate determined by the determining means 15.

The above-mentioned process can obviate the problem points of the prior art described above with reference to FIG. 14B.

When the detection means 14 detects that a request has been issued for opening an intended area by the operation of the input unit 4 or the like, the specifying means 14 specifies the size of the character or image in the intended area as displayed on the screen and the size of the character at the intended point on the screen. In response to this specification, the determining means 15 determines a magnification rate applicable to the particular intended area from the magnification rate supplied to the enlarged display means 12 and the character size specified by the specifying means in such a manner that the character in the intended area, for example, has the same size as the character at the intended point displayed in an enlarged form.

The enlarged display means 12 displays the intended area on the display unit 2 in an enlarged form and displays the characters in the intended area in an enlarged form in accordance with the magnification rate determined by the determining means 15.

This process can obviate the problem points of the prior art described with reference to FIG. 15B.

In the case where the detection means 13 detects that a request has been issued for opening an intended area by the operation of the input unit 3, the specifying means 14 specifies the size of the character in the intended area as displayed on the screen, and in response to this specification, the determining means 15 determines a magnification rate from a specified character size and the character size specified by the specifying means 14 in such a manner that the character in the particular intended area has the specified character size thereby to determine the magnification rate applicable to the particular intended area.

The enlarged display means 12 enlarges the intended area and displays it on the display unit 2 while at the same time displaying on the display unit 2 the character in the intended area in an enlarged form in accordance with the magnification rate determined by the determining means 15.

This process obviates the problem points of the prior art described with reference to FIG. 15B.

Assume that a request has been issued to scroll by the operation of the input unit 3 when the enlarged display means 12 displays the intended area in an enlarged form. In response to the scroll request, the scroll means 16 scrolls the intended area displayed in an enlarged form in a designated scroll direction. In the process, the second detection means 17 detects whether the trailing end of the intended area scrolled in the scroll direction has come to assume a state displayable on the display unit 2. Upon detection of this displayable state, the prohibition means 18 prohibits the scroll means 16 from scrolling any further in the scroll direction.

This process can solve the problem point of the prior art described above with reference to FIG. 16E.

In this configuration, the storage means 19 stores the coordinate point of the intended point providing a motive of opening the intended area. In response to this storage, the restoration means 20 operates in such a manner that as soon as a request is issued for erasing the intended area by the operation of the input unit 3 the enlarged display means 12 erases the intended area, and the coordinate stored in the storage means are set as an intended point to thereby restore the display state of the intended area immediately before the opening thereof.

This process can obviate the problem point of the prior art described with reference to FIG. 18C.

BRIEF DESCRIPTION OF THE DRAWINGS

FIG. 6 shows a processing flow for executing an enlarged display program according to a second embodiment.

FIGS. 12A and 12B show a processing flow for executing an enlarged display program according to a fifth embodiment.

FIGS. 13A, 13B to 18C are diagrams for explaining the image processing means according to the prior art.

DESCRIPTION OF THE PREFERRED EMBODIMENTS

Figure 1:
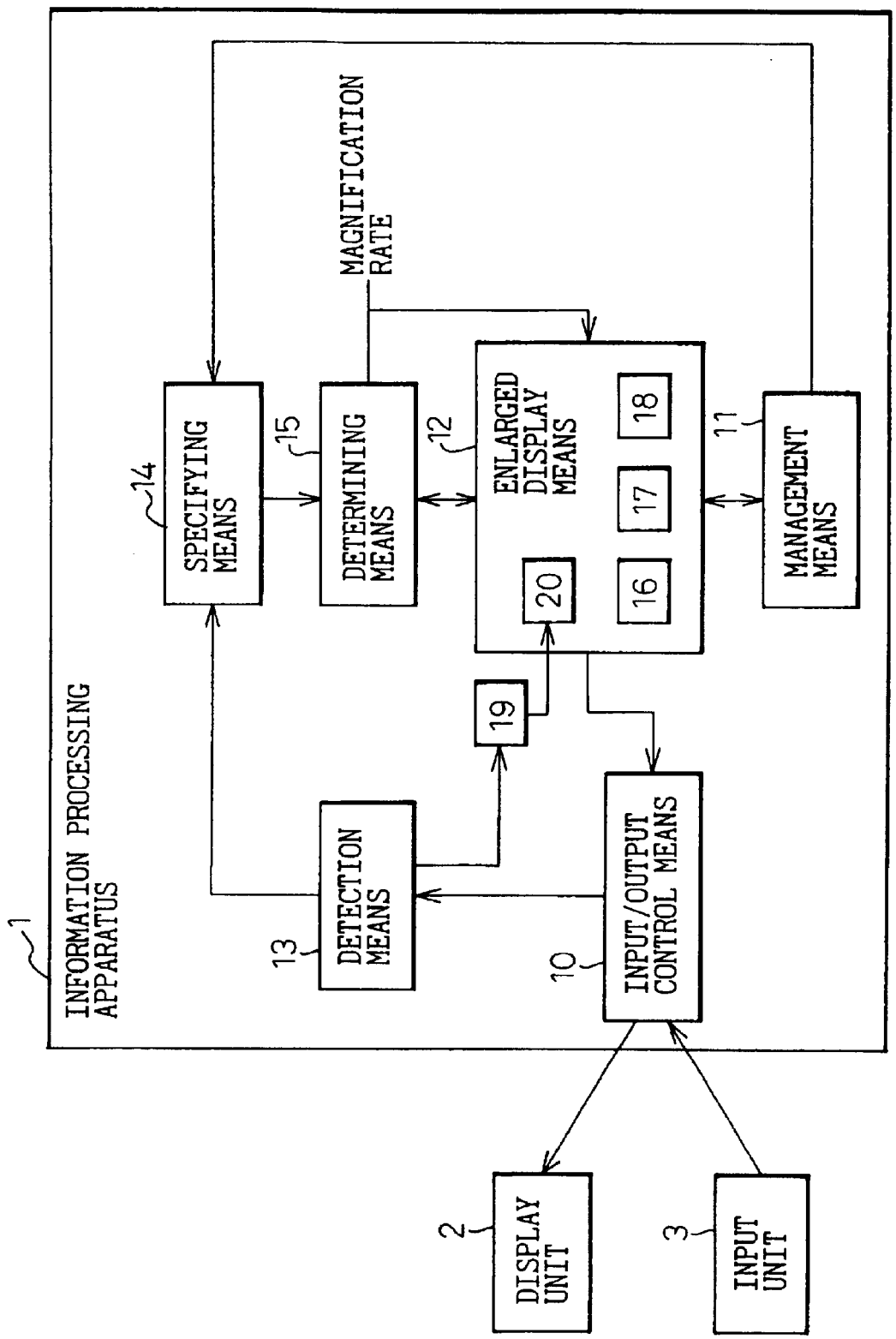
FIG. 1 is a diagram showing a basic configuration of the invention.
Figure 2:
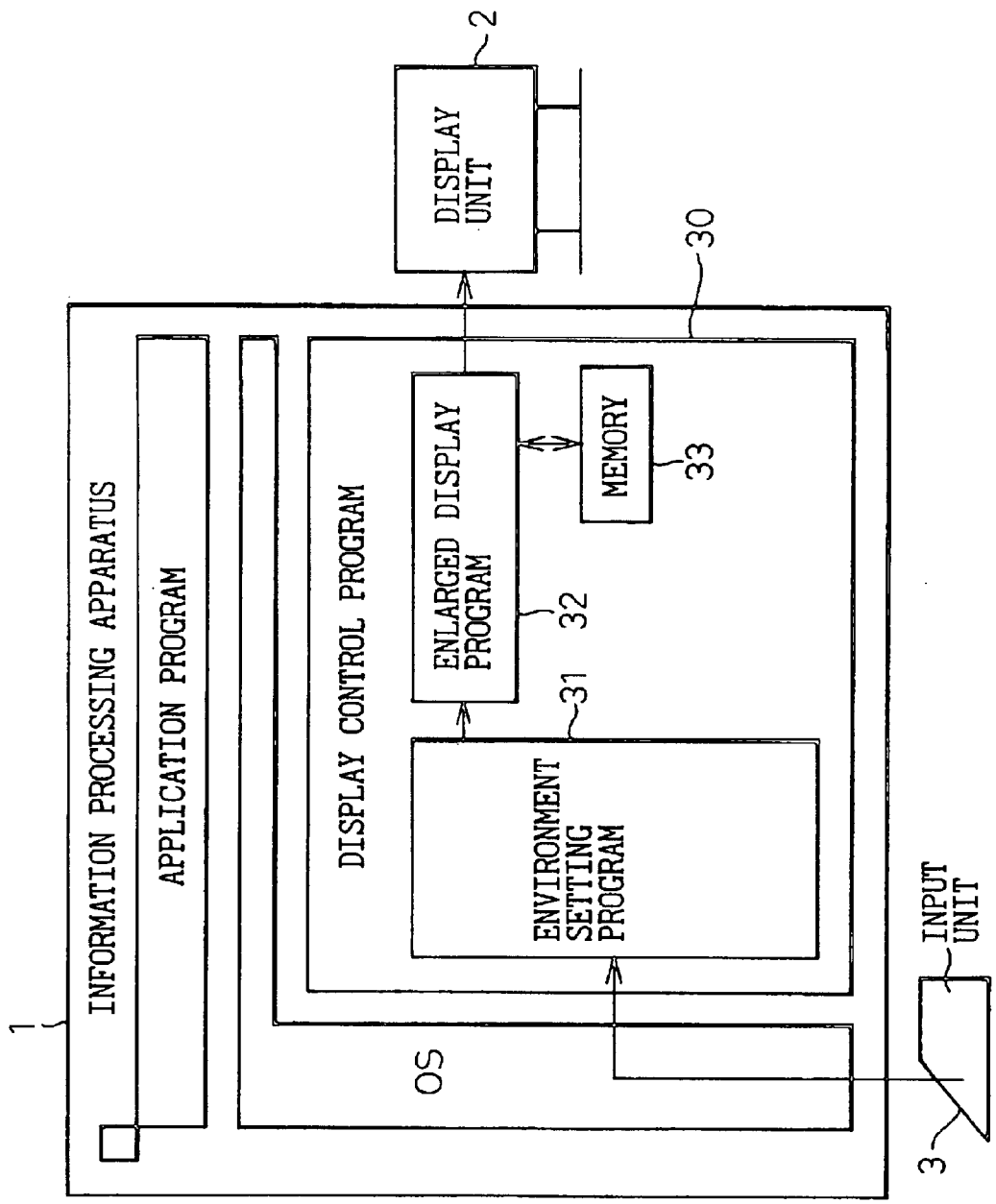
FIG. 2 is a diagram showing a program structure of an information processing apparatus according to this invention.

Embodiments of the invention will be described in detail with reference to the accompanying drawings. FIG. 2 shows a program structure included in the information processing apparatus 1 comprising a computer as a main component part thereof.

As shown in FIG. 2, the information processing apparatus 1 according to this invention comprises a display control program 30 responsible for processing the display control of data on the display unit 2, including an environment-setting program 31, an enlarged display program 32 and a memory 33 providing the working area of the enlarged display program 32.

The environment setting program 31 and the enlarged display program 32 are loaded in the memory (not shown) incorporated in the information processing apparatus 1, from a program storage medium.

Figure 3:
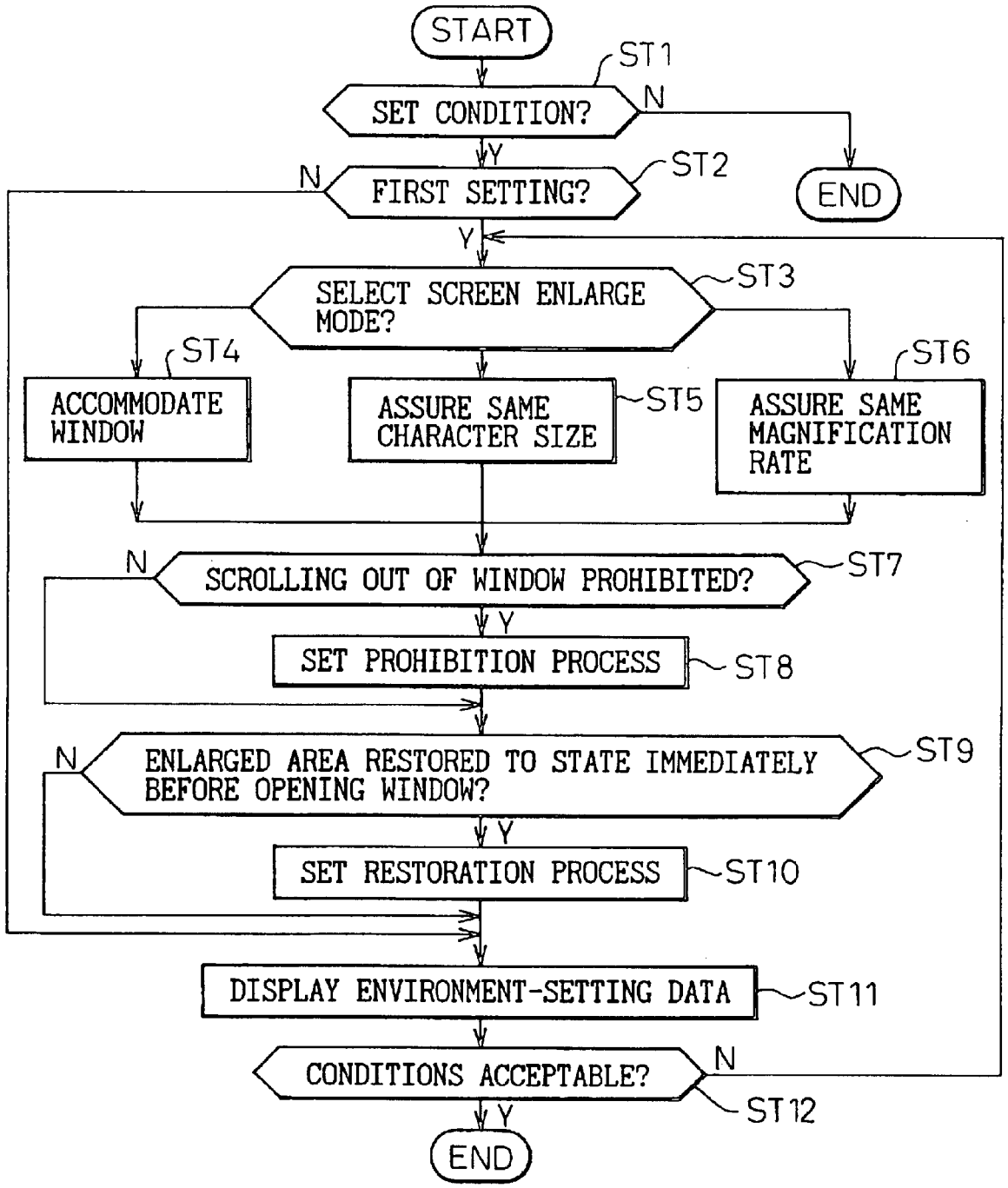
FIG. 3 shows a processing flow for executing an environment-setting program according to an embodiment.

FIG. 3 shows a processing flow for executing the environment-setting program 31 according to an embodiment, and FIGS. 4, 6, 8, 10, 12 show the processing flows for executing the enlarged display program 32 according to each embodiment. Now, the present invention will be described in detail with reference to these processing flows.

The environment-setting program, as shown in the processing flow of FIG. 3, first judges in step 1 whether a condition setting request for an enlarged display has been issued from the user. If no condition setting request is issued, the process is terminated as it is. The condition setting is defined as the selection of a screen enlarge mode described later, the selection as to whether the scrolling out of the window is to be prohibited and the selection as to whether the enlarged area is restored to the state immediately before opening the window.

In the case wherein step 1 judged that the condition setting request for enlarged display is issued by the user, the process proceeds to step 2 for a judgement as to whether it is the first condition setting. If the judgement is that the condition setting is not the first one, the process proceeds to step 11 for displaying the existing environment-setting data on the display unit 2. In step 12, the user is queried whether the particular environment-setting data is sufficient, and if the judgement is that the environment-setting data is sufficient, the process is terminated as it is.

In the case where the judgement in step 2 is that the condition setting is the first one, on the other hand, the process proceeds to step 3 for selecting the screen enlarge mode interactively with the user. The screen enlarge mode includes a first mode for enlarging the window to the full size of the screen, a second mode for enlarging the window to such an extent that each character in the window has the same size as the enlarged character outside the window, and a third mode for enlarging the window at the same magnification rate as the enlarged character outside the window.

In the case where the first mode is selected in step 3 for enabling the user to enlarge the window to the full size of the screen, for example, the process proceeds to step 4 for setting the particular screen enlarge mode. In the case where the user selects in step 3 the second mode in which the window is enlarged to such an extent that the size of the character in the window is the same as that of the enlarged character outside the window, the process proceeds to step 5 for setting the particular screen enlarge mode. In the case where the user selects in step 3 the third mode in which the window is enlarged in accordance with the same magnification rate as the enlarged character outside the window, in contrast, the process proceeds to step 6 for setting the particular screen enlarge mode.

Then, in step 7 it is determined determines interactively with the users whether a fourth mode is to be selected for prohibiting the scrolling out of the enlarged window. In the case where the user selects the fourth mode for prohibiting the scrolling outside the enlarged window, the process proceeds to step 8 for setting the same mode.

In the case where the enlarged window is erased by the interaction with the user in step 9, the user determines whether a fifth mode is selected for restoring the display state immediately before opening the window. Once the user selects the fifth mode for restoring the display state immediately before opening the window, the process proceeds to step 10 for setting the same mode.

In step 11, displays on the display unit 2 the environment-setting data, i.e., the selection of one of the first to fifth modes set in steps 3 to 10. Step 12 makes an query of the user whether the particular environment-setting conditions are satisfactory. In the case where the judgement is that the environment-setting conditions are satisfactory, the process is terminated as it is. If the judgement is that the particular environment-setting conditions are not satisfactory, in contrast, the process returns to step 3.

As described above, the environment-setting program 31 sets an enlarged display mode as the window is opened. The environment-setting program 31 also sets the magnification rate of the portions other than the window.

Now, the process for executing the enlarged display program 32 will be explained.

Figure 4:
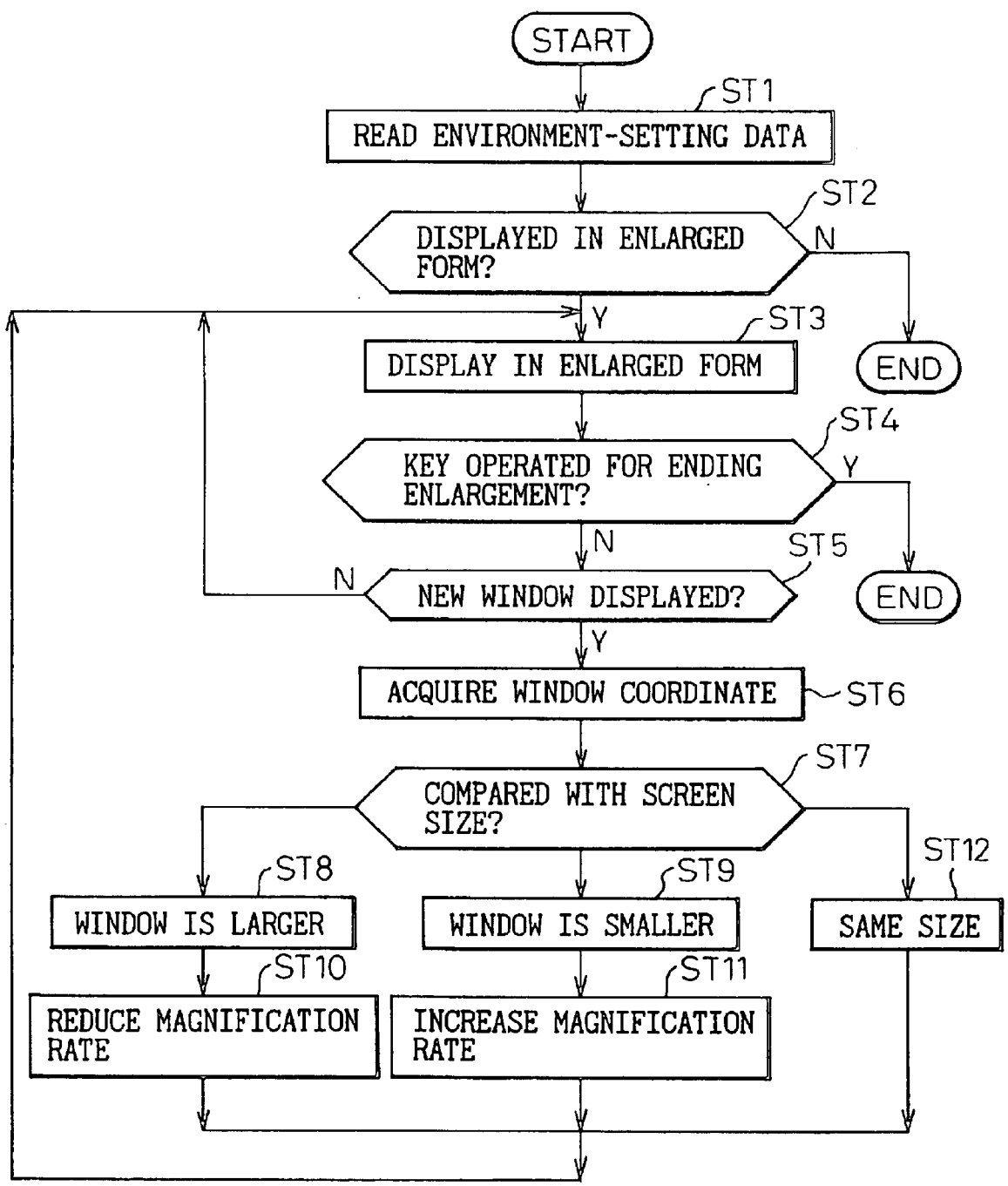
FIG. 4 shows a processing flow for executing an enlarged display program according to a first embodiment.

In the enlarged display program 32, assume that the processing flow of FIG. 4 is executed. First, the enlarged display program 32 reads the environment-setting mode set by the environment-setting program 31. Then, upon receipt of an enlarge instruction by key operation or the like, the process proceeds to step 3 for displaying each character on the display unit 2 at the magnification rate designated by the environment-setting data. At the same time, the screen is determined in accordance with the designated magnification rate.

The processing flow shown in FIG. 4 presupposes the selection of the mode for enlarging the window to the full size of the screen. This fact can be recognized by the environment-setting data read in step 1.

Figure 13A:
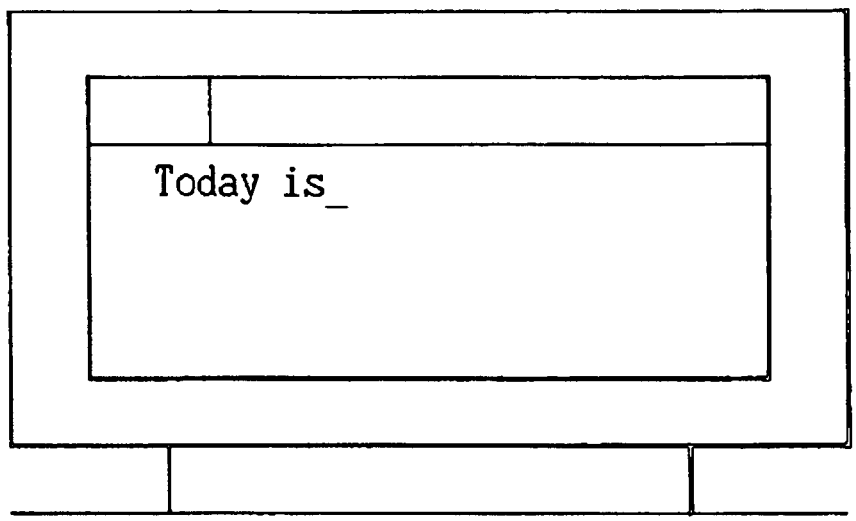
Figure 13B:
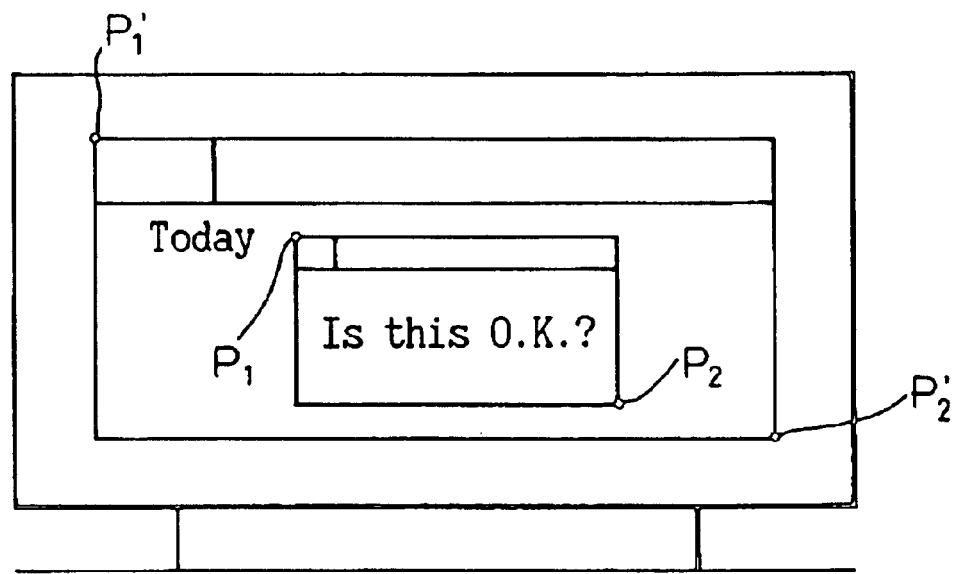

In step 4 it is monitored whether the key operation is performed after complete enlargement while enlarging the character displayed on the display unit 2. In the process of step 5, it is judged whether a new window is opened as shown in FIG. 13B by an application program. In the case where the judgement is that a new window has been opened, the process proceeds to step 6, in which a function command for acquiring the window coordinates (on the reference screen), i.e., the coordinates at points $P_1$, $P_2$ in FIG. 13B, is issued to the operating system thereby to acquire the size of the particular window from the operating system.

The process of step 7 enlarges the size of the window acquired in step 6 in accordance with the designated magnification rate, and compares the enlarged window with the screen thereby to judge whether the enlarged window can be displayed on the screen. In the case where step 8 judges whether the window is larger and cannot be displayed on the screen, the process proceeds to step 10 for reducing the designated magnification rate. In this way, the window is enlarged to a size sufficient to be contained in the screen, and is displayed thereon.

In the case where the process of step 7 compares the enlarged window with the screen and the process of step 9 judges that the screen is larger, on the other hand, the process proceeds to step 11 thereby to increase the designated magnification rate. Thus the window is enlarged to fill up the screen and displayed thereon. Step 11 can be omitted.

In the case where the process of step 7 compares the enlarged window with the screen, followed by the judgement in step 12 that the both sizes are the same, on the other hand, the window enlarged at the designated magnification rate is displayed as it is on the screen.

Figure 5A:
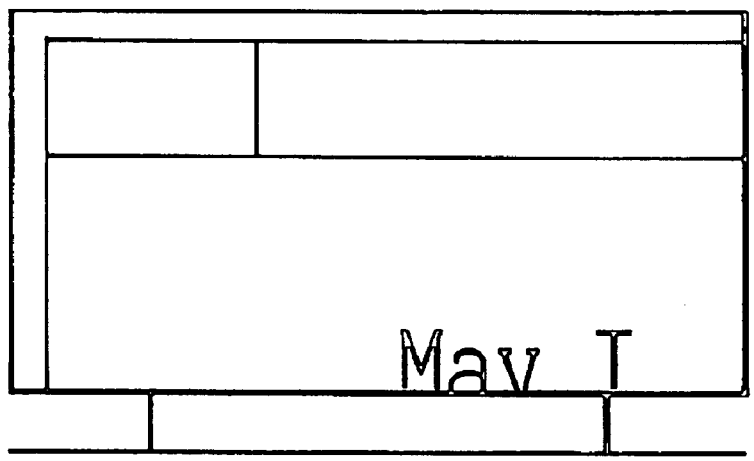
FIGS. 5A, 5B are diagrams showing a screen according to the first embodiment.
Figure 5B:
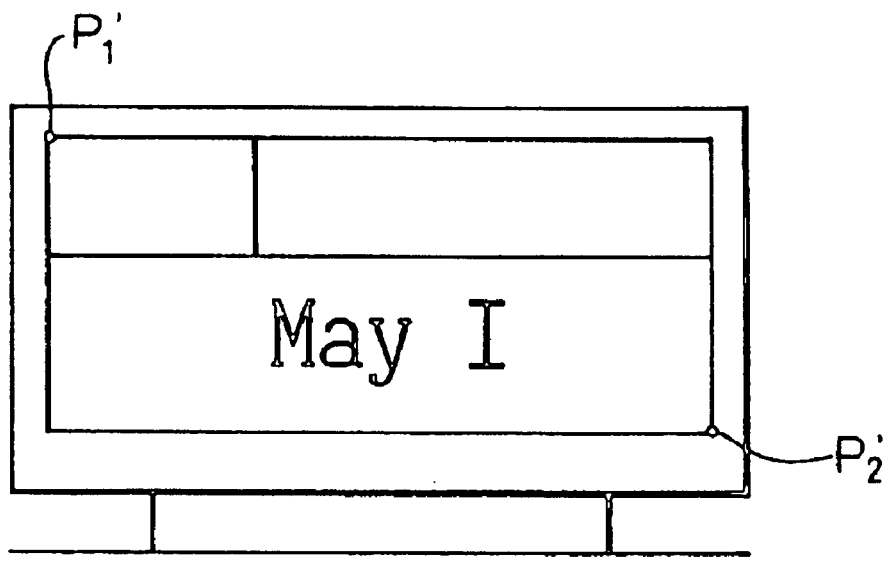
Figure 14A:
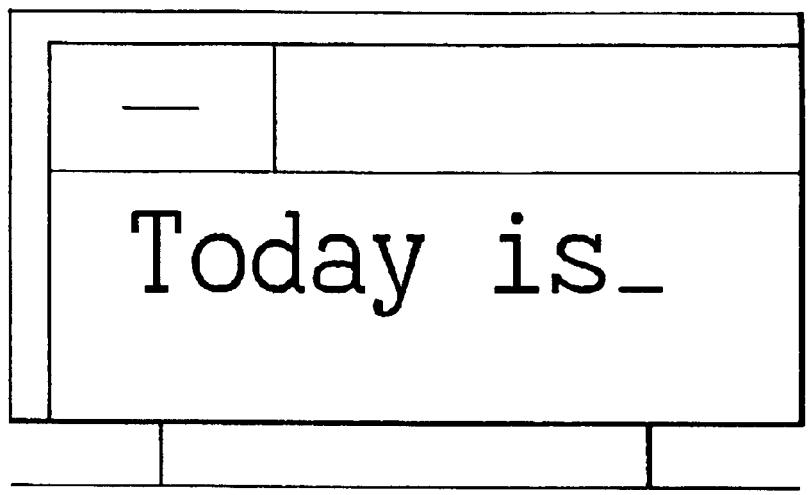
Figure 14B:
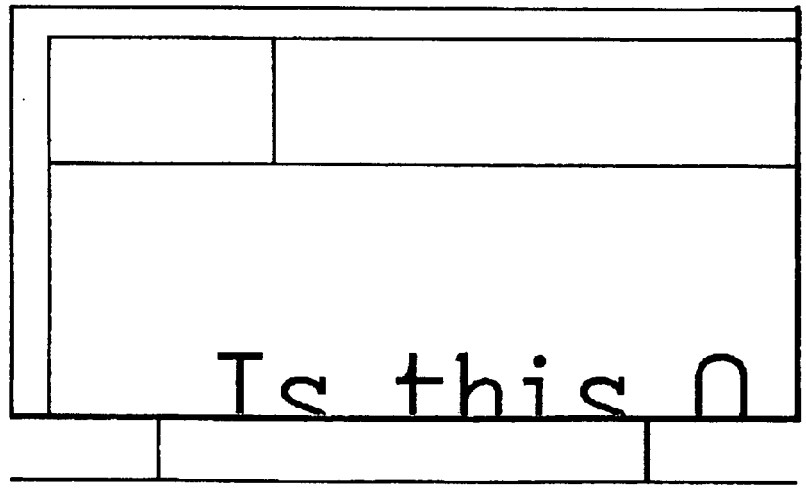

As described with reference to FIGS. 14A, 14B, the conventional apparatus is so configured that the window is enlarged and displayed using the magnification rate as of the time of character entry. The probable result is an inconvenience such as that shown in FIG. 5A (the same as 14B), where only a portion of each character in the window is displayed. According to the present invention, in contrast, the window is enlarged and displayed within the size of the screen as shown in FIG. 5B according to the enlarged display program 32, in such a manner that the window coordinate points $P_1$, $P_2$ shown in FIG. 13B are representative of the coordinate points $P_1'$ and $P_2'$ of FIG. 5B, respectively. The above-mentioned inconvenience is thus obviated.

In the processing flow of FIG. 6, the enlarged display program 32 also reads in step 1 the environment-setting mode set by the environment-setting program 31. Then, upon receipt of an enlarge instruction by key operation or the like in step 2, the process proceeds to step 3 for acquiring the size of the system character as displayed on the reference screen, followed by step 4 for enlarging and displaying the character on the display unit 2, in accordance with the magnification rate designated by the environment-setting data.

The processing flow shown in FIG. 6 presupposes that the mode is selected to enlarge the window in such a manner that each character within the window has the same size as the enlarged character outside the window. This fact is recognized through the environment-setting data read in step 1.

The process of step 5 monitors whether the key operation has been performed for completing the enlargement while at the same time enlarging the character displayed on the display unit 2. In the process of step 6 it is judged whether a new window has been opened by an application program. In the case where the judgement is that a new window has been opened, the process proceeds to step 7 for acquiring the size of the character in the window as displayed on the reference screen.

In step 8, the size of the system character acquired in step 3 is compared with the size of the character in the window acquired in step 7, followed by step 9. In the case where step 9 judges that the size of the character in the window is larger, the process proceeds to step 12 for changing the designated magnification rate downward in accordance with the ratio between the two character sizes. In this way, a magnification rate is determined at which the character in the window has the same in size as the enlarged character outside the window, so that the window is enlarged and displayed in accordance with the resulting magnification rate.

In the case where comparison between the size of the system character acquired in step 3 and the size of the character in the window acquired in step 7 leads to the judgement in step 10 that the size of the character outside the window is larger, in contrast, the process proceeds to step 13, where the designated magnification rate is changed upward in accordance with the ratio between the two character sizes. In this way, a magnification rate is determined at which the character in the window has the same size as the character outside the window, and the window is enlarged and displayed in accordance with the particular magnification rate.

Assume, on the other hand, that the process of step 8 compares the size of the character acquired in step 3 with the size of the character in the window acquired in step 7, and that the process of step 11 judges that the sizes of the two characters are the same. Then, the window is enlarged and displayed according to the designated magnification rate.

Figure 7A:
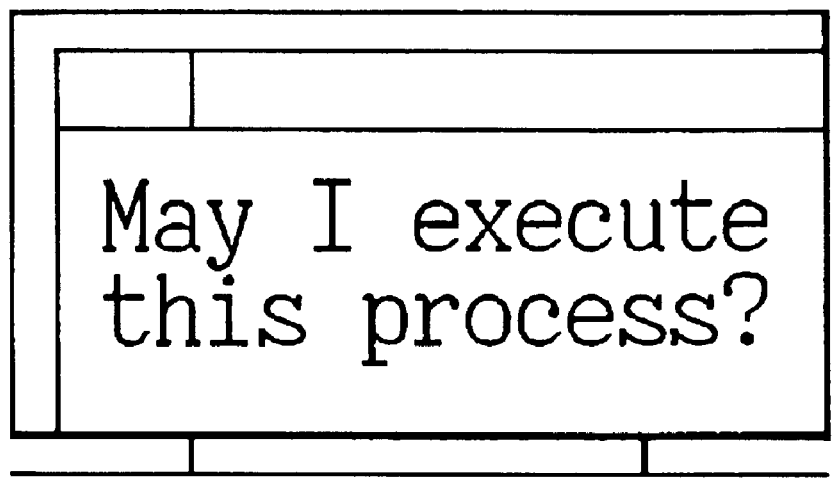
FIGS. 7A, 7B are diagrams showing a screen according to the second embodiment.
Figure 7B:
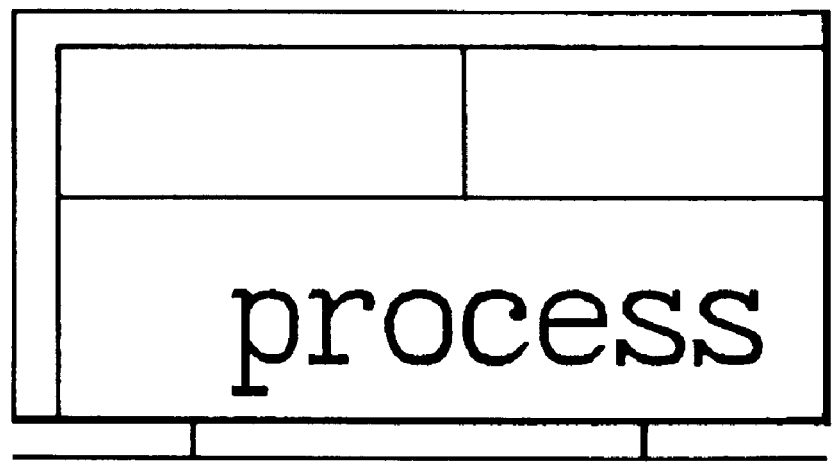
Figure 15A:
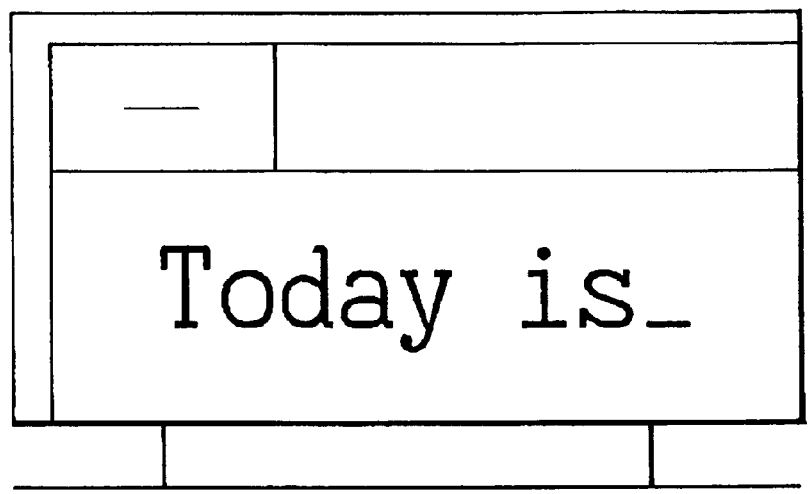
Figure 15B:
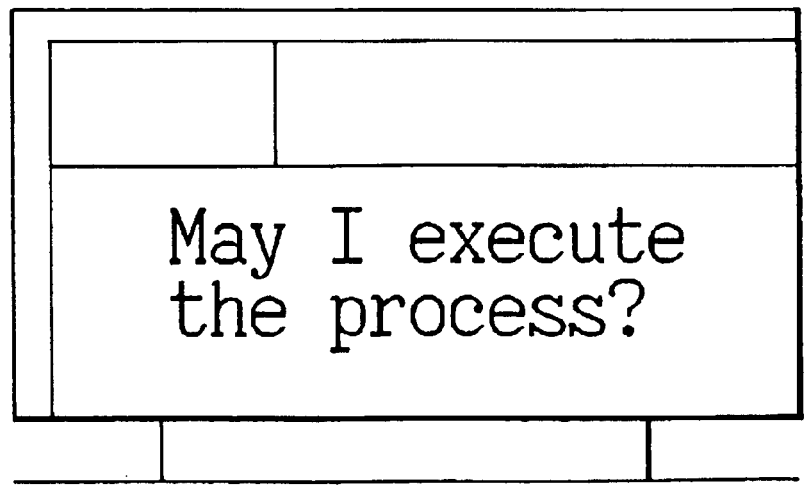

As described with reference to FIGS. 15A, 15B, according to the prior art, the window is enlarged and displayed using the magnification rate as of the time of character entry. As shown in FIG. 7A (the same as FIG. 15B), therefore, the character in the window is displayed inconveniently smaller. According to the present invention, in contrast, the execution of the enlarged display program 32 permits the character in the window to be enlarged and displayed at the same size as the enlarged character outside the window/as shown in FIG. 7B, thereby obviating the above-mentioned inconvenience.

The processing flow of FIG. 6 presupposes that a mode is selected to enlarge the window in such a manner that the size of the character in the window is the same as that of the character outside the window. Alternatively, a mode can be provided to enlarge the window in such a manner that the character in the window has a specified size, so that the window is enlarged and displayed in accordance with the ratio between the size of the character in the window and the specified character size with an equal effect, as in the processing flow of FIG. 6.

Figure 8:
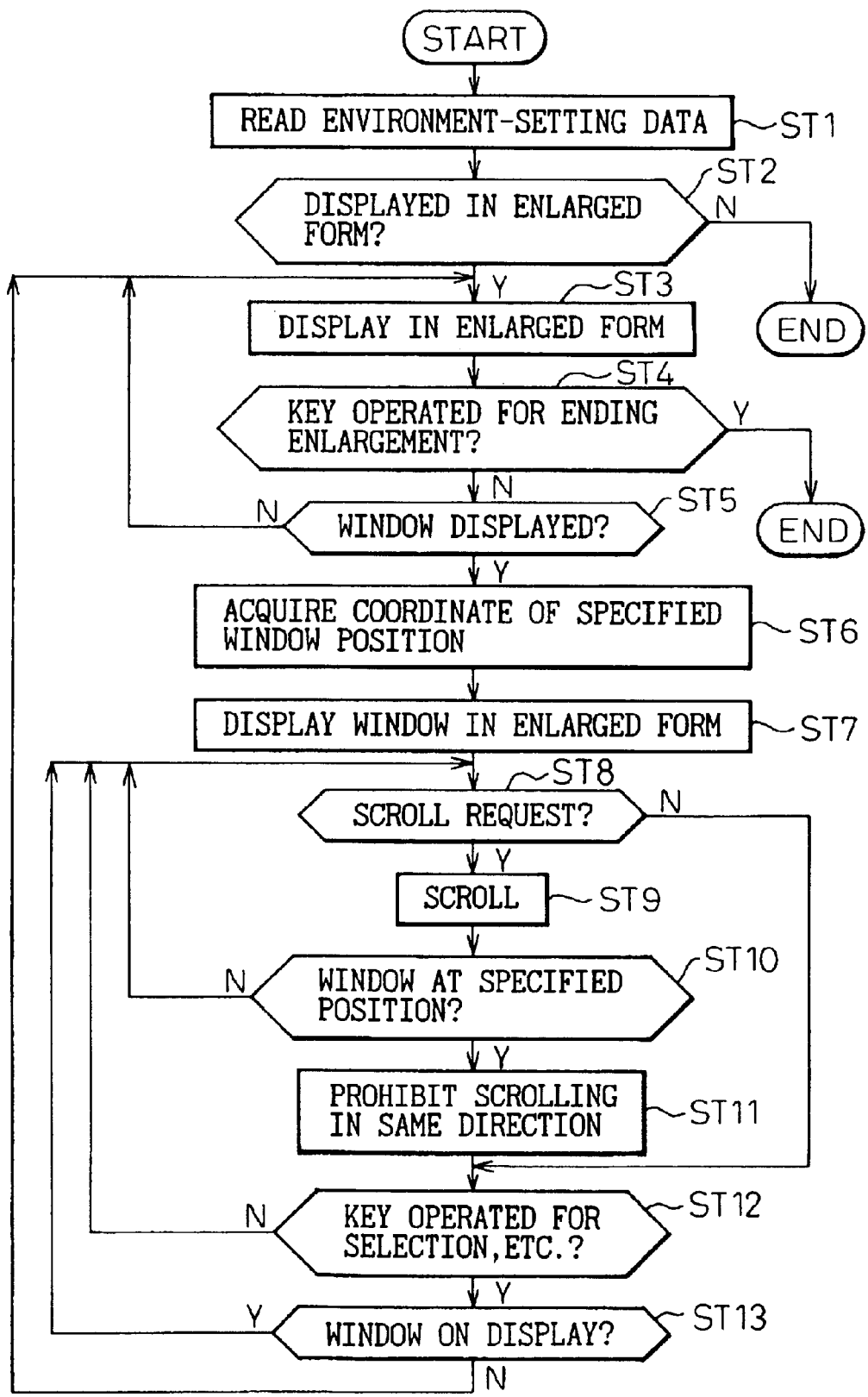
FIG. 8 shows a processing flow for executing an enlarged display program according to a third embodiment.

Also, in the case where the enlarged display program 32 executes the processing flow of FIG. 8, first the enlarged display program 32 in step 1, reads the environment-setting mode set by the environment-setting program 31, followed by step 2, where upon receipt of an enlarge instruction by key operation or the like, the process proceeds to step 3, where the character displayed on the display unit 2 is enlarged and displayed at the magnification rate designated by the environment-setting data.

The processing flow of FIG. 8 presupposes that the mode for prohibiting the scrolling out of the enlarged window is selected. This can be recognized by the environment-setting data read in step 1.

Step 4 monitors whether the key operation for completing the enlargement is performed while enlarging the character displayed on the display unit 2. At the same time, the process of step 5 judges whether a window has been opened by an application program. If the judgement is that a window has been opened, the process proceeds to step 6 for acquiring the coordinate of a specified position of the window. The particular window is enlarged and displayed in step 7.

The process of step 8 judges whether a scroll request is issued to the enlarged window. In the case where the judgement is that no scroll request is issued, the process proceeds to step 12, as described later. In the event that the judgement is that a scroll request is issued, on the other hand, the process proceeds to step 9, where the enlarged window is scrolled. Then, in step 10 it is judged whether the trailing end of the window has reached the state displayable on the display unit by scrolling.

In the case where the judgement in step 10 is that the trailing end of the window has not reached a state where it can be displayed on the display unit 2, the process returns to step 8, thereby permitting the scrolling to be continued. If the judgement is that the trailing end has reached such a displayable state, in contrast, the process proceeds to step 11 and a further scrolling in the scroll direction is prohibited.

The process of step 12 judges whether the key operation for selecting an item in the window is performed or not. If the judgement is that no such key operation is performed, the process returns to step 8. In the case where the judgement is that the key operation is performed, on the other hand, the process proceeds to step 13 for judging whether or not the window has been erased by the key operation. If in step 13 it is judged that the window is on display, the process returns to step 8, while if the judgement is that the window has been erased, the process returns to step 3.

Figure 9A:
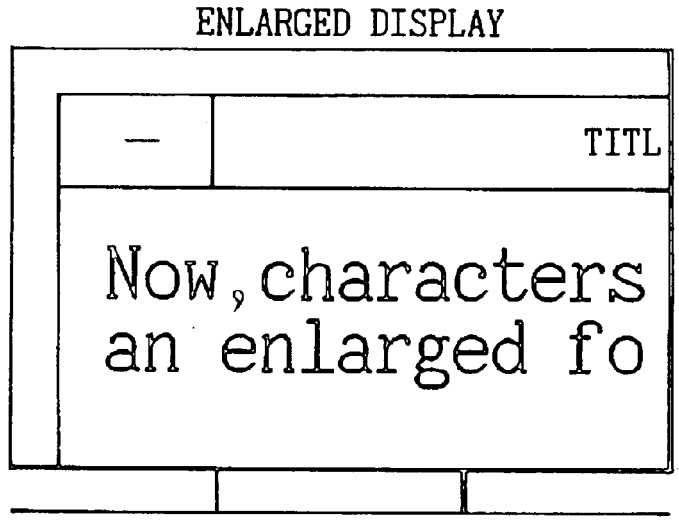
FIGS. 9A, 9B, 9C are diagrams showing a screen according to the third embodiment.
Figure 9B:
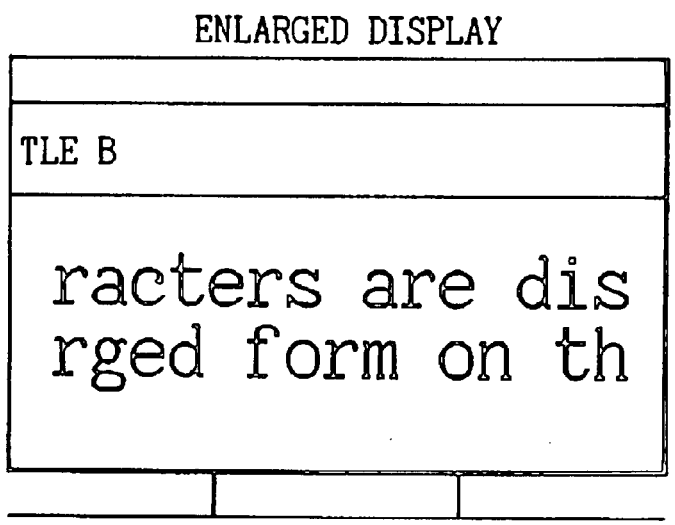
Figure 9C:
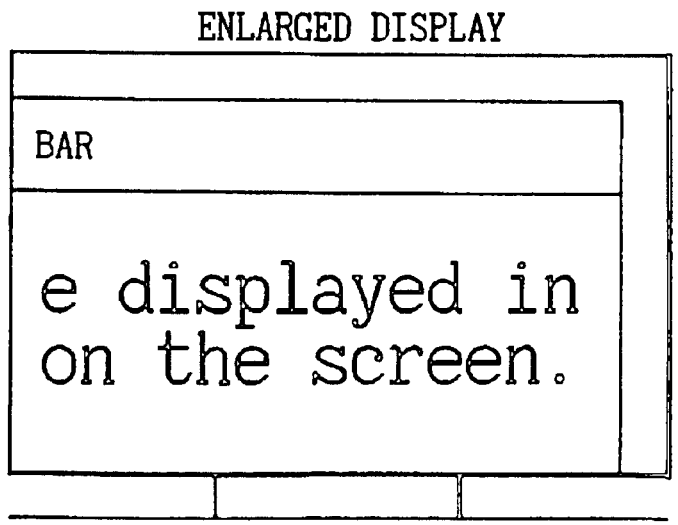
Figure 16A:
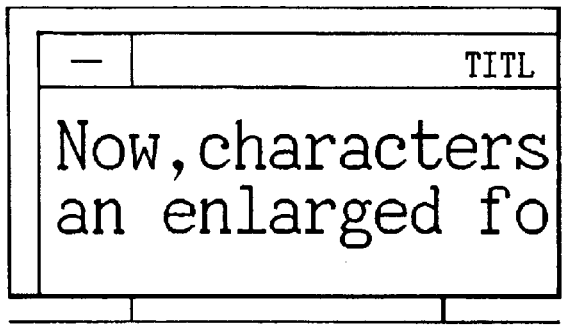
Figure 16D:
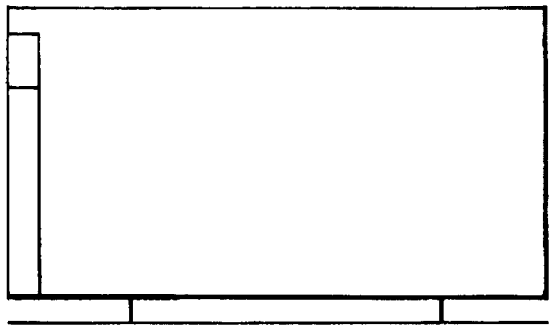
Figure 16B:
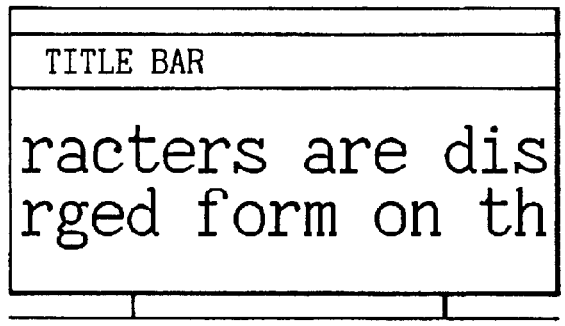
Figure 16E:
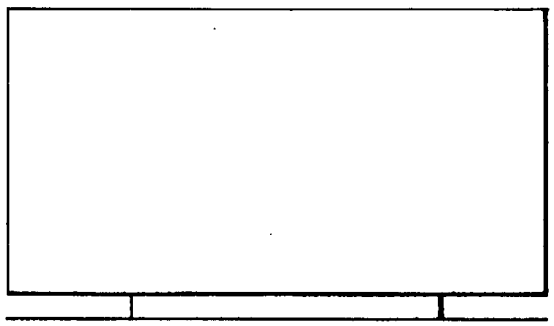
Figure 16C:
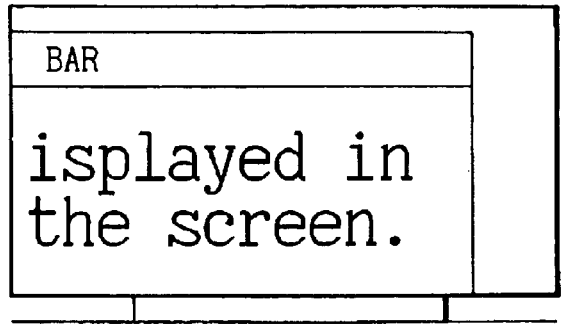
Figure 17A:
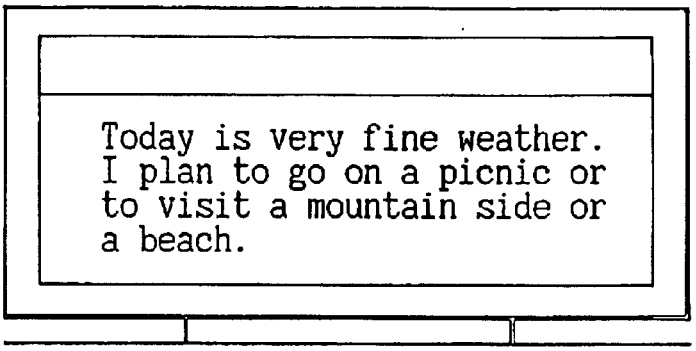
Figure 17B:
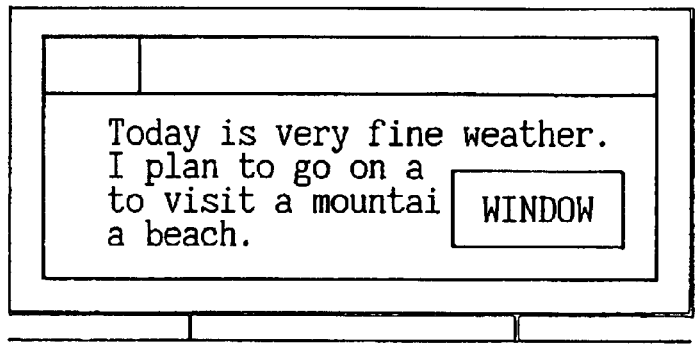
Figure 17C:
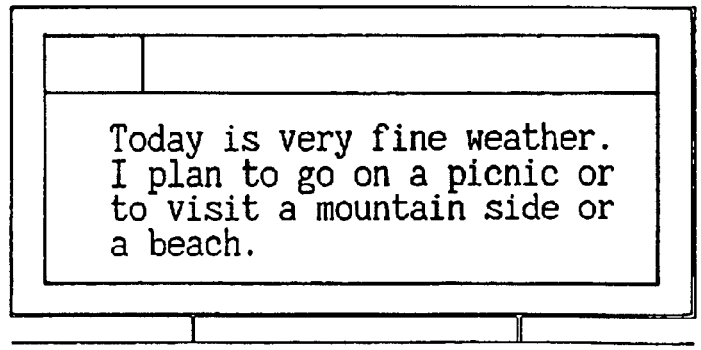

As explained with reference to FIGS. 16A to 16E, the prior art employs a configuration in which no limitation is imposed on the scrolling of an enlarged window. As shown in FIG. 16E, this gives a rise to a convenience that the scrolling extends out of the window. According to this invention, however, the process of the enlarged display program 32 prohibits the scrolling in the scroll direction beyond the point where the trailing end of the window can be displayed on the display unit 2 as shown in FIGS. 9A to 9C. The above-mentioned inconvenience, therefore, can be obviated.

Figure 10:
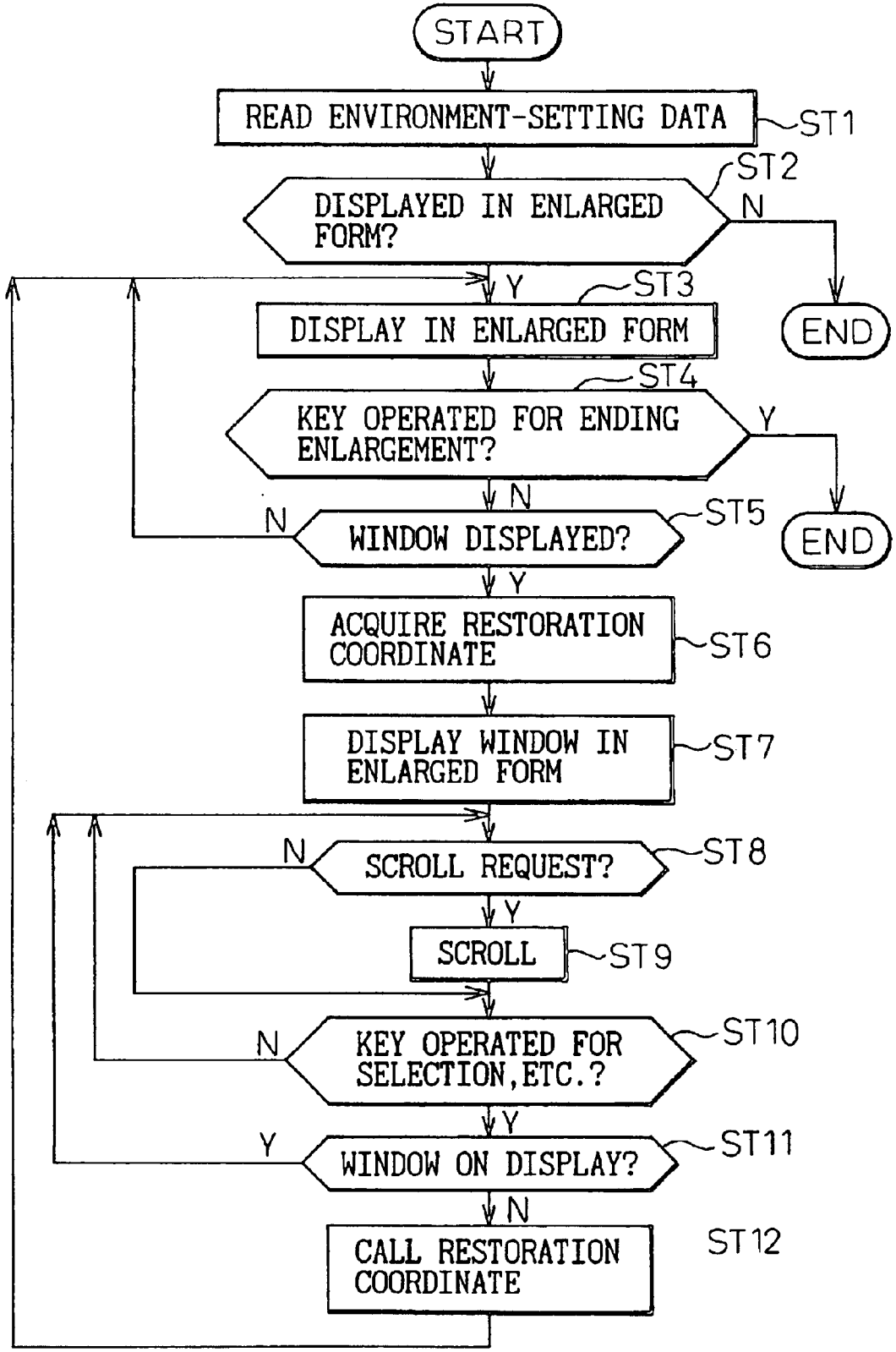
FIG. 10 shows a processing flow for executing an enlarged display program according to a fourth embodiment.

According to the enlarged display program 32 based on the processing flow of FIG. 10, the enlarged display program 32 in step 1, reads the environment-setting mode set by the environment-setting program 31, followed by step 2, which upon receipt of an enlarge instruction by key operation or the like, proceeds to step 3, in which the characters are displayed in an enlarged form on the display unit in accordance with the magnification rate designated by the environment-setting data.

The processing flow of FIG. 10 presupposes that the mode selected restores the display state immediately before opening the window when erasing the enlarged window. The fact thus is informed in accordance with the environment-setting data read in step 1.

The process of step 9 monitors whether the key operation for ending the enlargement is performed, while at the same time the characters displayed on the display unit are enlarged. At the same time, in step 5 it is judged whether a window has been opened by an application program. In the case where the judgement is that a window is opened, the process proceeds to step 6 where the coordinate indicated by the cursor immediately before opening the window is acquired and stored in the memory 33 as a restored coordinated. The process of step 7 displays the particular window in an enlarged form.

In step 8 it is judged whether a scroll request is issued for the enlarged window, and when the judgement is that a scroll request is issued, the process proceeds to step 9 where the enlarged window is scrolled. Then, in step 10 it is judged whether any key operation is performed for selecting an item in the window. If the judgement is that the key operation is not performed, the process returns to step 8, whereas if the judgement is that the key operation has been performed, the process proceeds to step 11 for judging whether the window is erased or not by the particular key operation.

In the case where in step 11 it is judged that the window is displayed, the process returns to step 8. When the judgement is that the window is erased, the process proceeds to step 12 for calling out the restored coordinate from the memory 8, followed by returning to step 3, thereby returning to the display state at the particular restored coordinate position.

Figure 11A:
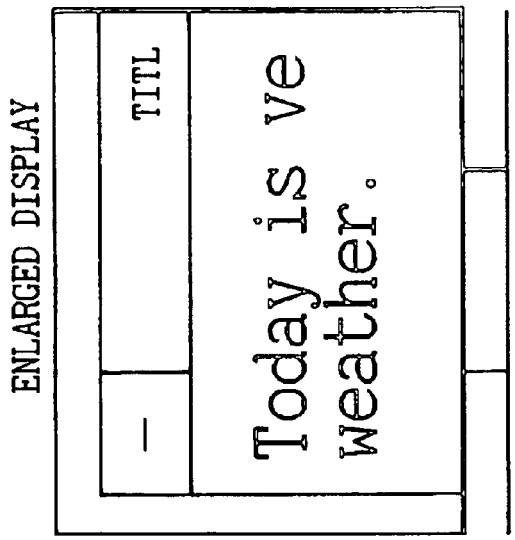
FIGS. 11A, 11B, 11C are diagrams showing a screen according to the fourth embodiment.
Figure 11B:
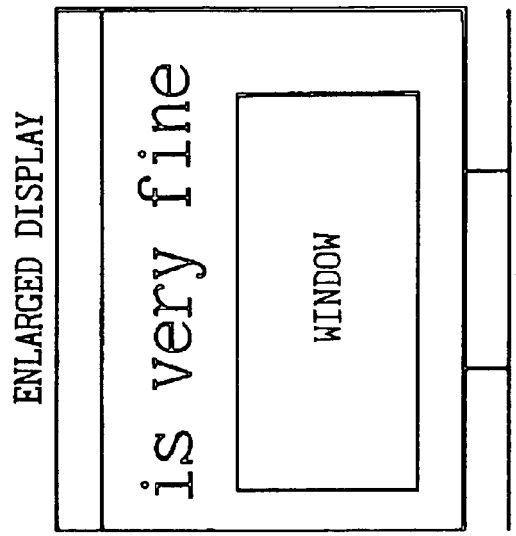
Figure 11C:
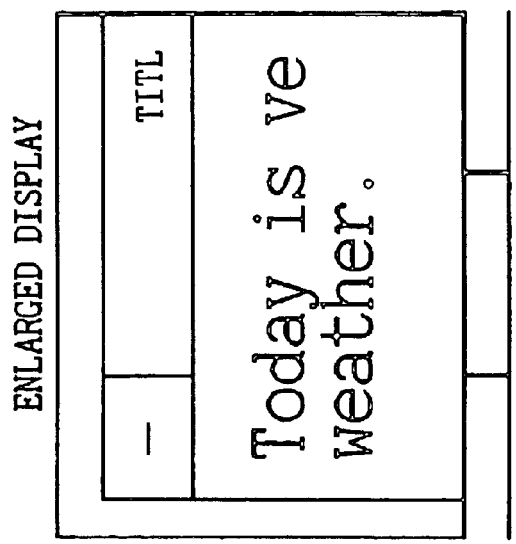
Figure 18A:
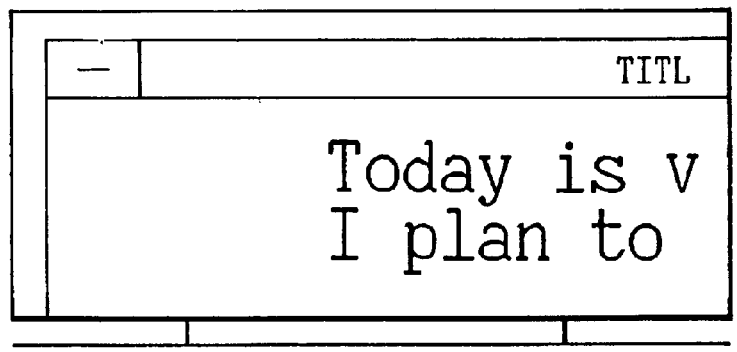
Figure 18B:
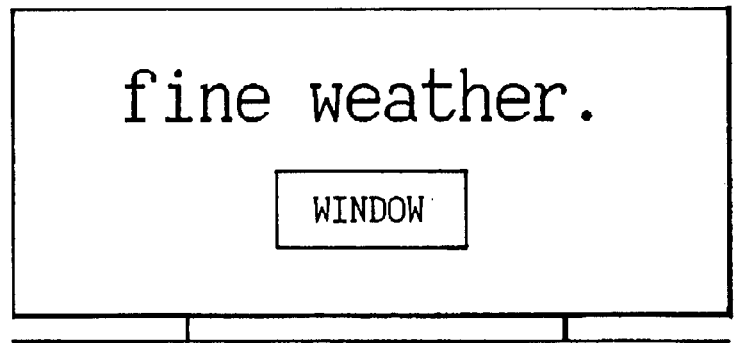
Figure 18C:
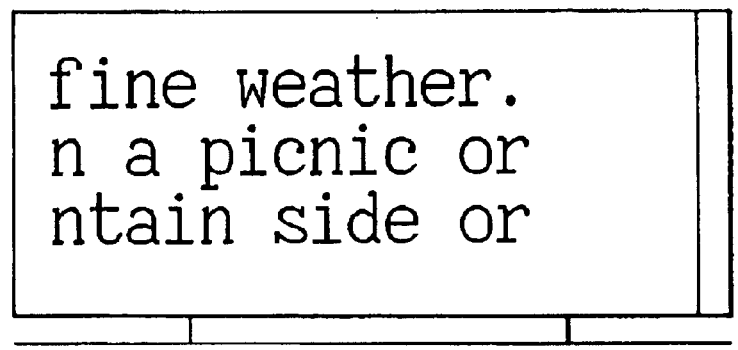

As explained with reference to FIGS. 18A, 18B, 18C, the prior art employs a configuration for erasing an enlarged window directly. As shown in FIG. 18C, therefore, the display state immediately before opening the window cannot be restored inconveniently. According to the present invention, on the other hand, the display state (FIG. 11C), immediately before opening the window, is automatically restored when erasing an enlarged window, as shown in FIG. 11B according to the enlarged display program 32, and therefore the above-mentioned inconvenience is obviated.

Figure 12B:
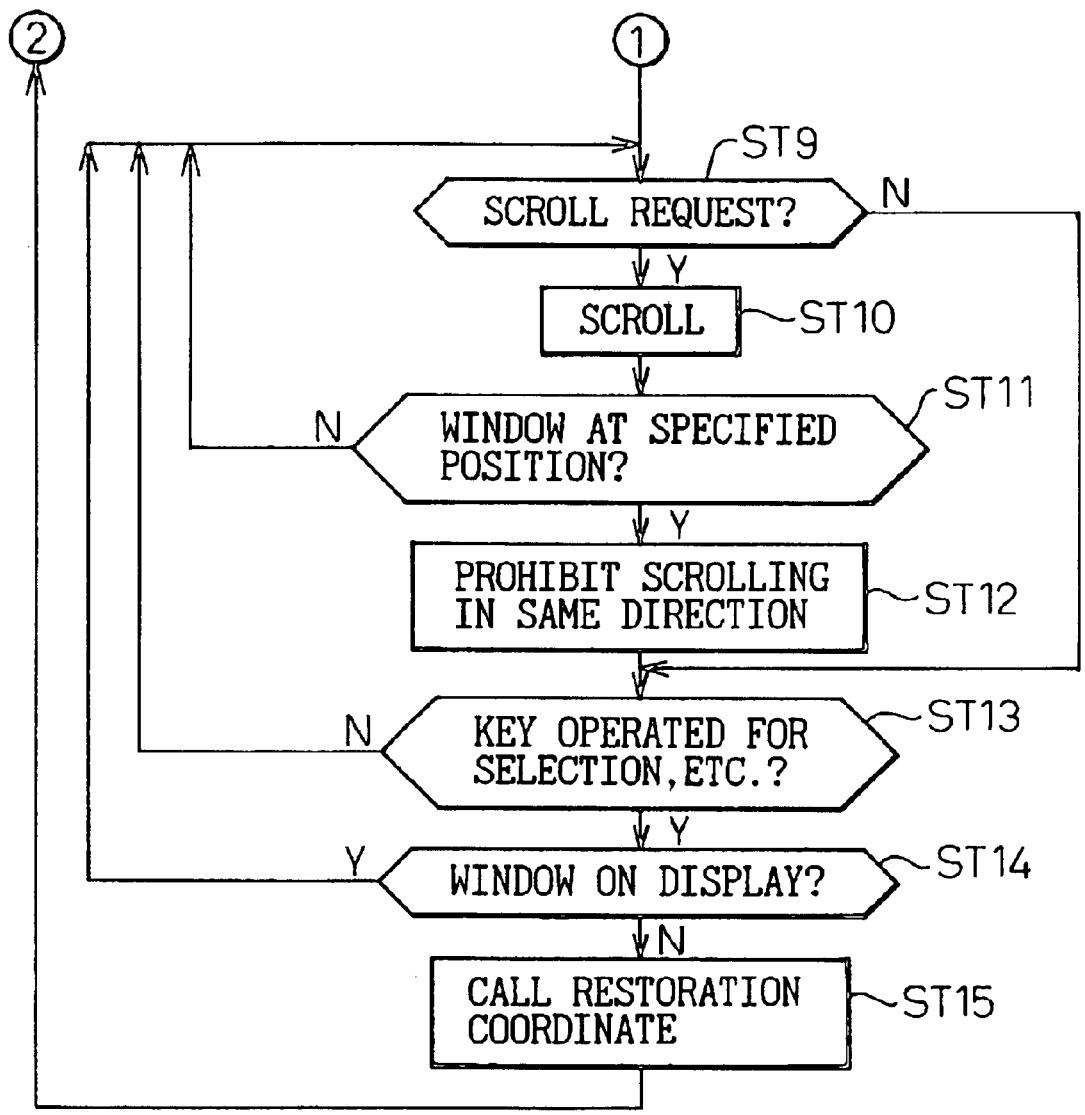

Also, in the case where the processing flow of FIGS. 12A and 12B is used, step 1 of the enlarged display program 32 reads the environment-setting mode set by the environment-setting program 31. Then, upon receipt of an enlarge instruction by key operation or the like in step 2, the process proceeds to step 3, so that the character is enlarged and displayed on the display unit 2 at the magnification rate designated by the environment-setting data.

In the processing flow of FIGS. 12A and 12B, it is assumed that the mode is selected, in which the scrolling out of the enlarged window is prohibited, and in which the display state is restored to the state immediately before opening the window when erasing the enlarged window. This fact can be recognized in accordance with the environment-setting data read in step 1.

The process of step 4 enlarges the character displayed on the display unit 2 while monitoring whether the key operation for ending the enlargement is performed or not. At the same time, in step 5 it is judged whether a window is opened by an application program. In the case where the judgement is that a window is opened, the process proceeds to step 6 for storing the coordinate indicated by the cursor immediately before opening the window in the memory 33 as the restored coordinate, followed by step 7 for acquiring the coordinate of the specified window position. The process further proceeds to step 8 for displaying the particular window in an enlarged form.

Then, in step 9 it is judged whether or not a scroll request has been issued to the enlarged window. If the judgement is that no scroll request is issued, the process proceeds to the step 13 described later. If the judgement is that a scroll request is issued, on the other hand, the process proceeds to step 10 for scrolling the enlarged window. Then, in step 11 it is judged whether or not the trailing end of the window has reached such a state as displayable on the display unit 2 by scrolling.

In the case where the judgement in step 11 is that the trailing end of the window has not reached such a state as displayable on the display unit 2, the process returns to step 9 for permitting the continued scrolling. In the case where the judgement in step 11 is that the trailing end of the window has reached such a state, on the other hand, the process proceeds to step 12 for prohibiting the window from being further scrolled in the scrolling direction.

Then, in step 13 it is judged whether the key operation for selecting an item in the window has been performed or not. In the case where the judgement is that no key operation is performed, the process returns to step 9. In the case where the key operation is performed, on the other hand, the process proceeds to step 14 for judging whether or not the window is erased by the particular key operation. Upon judgement that the window is still on display in step 14, the process returns to step 9. When the judgement is that the window is erased, on the other hand, the process returns to the process of step 15. Step 15 calls out the restored coordinate from the memory 33 and the process returns to step 3, thereby restoring the display state at the restored coordinate position.

As described with reference to FIGS. 16A to 16E, the prior art employs a configuration of not adding any limitation to the scrolling of an enlarged window, and therefore, the inconvenience of scrolling out of the window occurs as shown in FIG. 16E. According to this invention, on the other hand, when the trailing end of the window reaches a state displayable on the display unit 2, the window is prohibited from scrolling further in the scrolling direction as shown in FIG. 9C. The above-mentioned inconvenience, therefore, can be obviated.

Further, as described with reference to FIGS. 18A, 18B, 18C, the prior art employs a configuration of erasing an enlarged window directly. As shown in FIG. 18C, therefore, the display state immediately before opening the window cannot be restored inconveniently. According to the present invention, in contrast, the display state immediately before opening a window is automatically restored when erasing an enlarged window as shown in FIG. 11B according to the process of the enlarged display program 32, thereby obviating the above-mentioned inconvenience.

It will thus be understood from the foregoing description that in an information processing apparatus according to this invention having the function of displaying characters in an enlarged form, the window is enlarged to fill up the screen, the characters in the window are enlarged, the scrolling of the window is limited, and the display state immediately before opening the window is restored when erasing the window. In this way, the user can easily grasp the contents of the data on display in the window in an enlarged form.

What is claimed is:

1. An information processing apparatus for displaying at least a character or an image in a first intended area, defined by a first magnification rate, in an enlarged form at the first designated magnification rate on a screen of a display unit in a second intended area newly opened on the screen, comprising:

a detection unit detecting whether a request for opening said second intended area is issued;

a determining unit determining a second magnification rate for said second intended area that enlarges said first intended area to said second intended area from a size of a first intended pre-enlarged area as displayed on the screen, and a size assigned to a second intended after-enlarged area to be enlarged on the screen, when said detection unit detects that a request is issued for opening said second intended area; and an enlarged display unit displaying said first intended area with said characters or said images in the area on the display screen in an enlarged form within said second intended area in accordance with said second magnification rate determined by said determining unit.

2. An information processing apparatus according to claim 1, wherein said determining unit:

corrects said second magnification rate upward in proportion to the difference between sizes of said first and second intended areas in the case where a size of said second intended area as displayed on the screen is larger than a size of said first intended area;

maintains said second magnification rate as it is in the case where the size of said second intended area as displayed on the screen is equal to the size of said first intended area; and corrects said second magnification rate downward in proportion to the difference between the sizes of said first and second intended areas in the case where the size of said second intended area as displayed on an enlarged screen is smaller than the size of said first intended area.

3. An information processing apparatus according to claim 1, wherein:

said determining unit calculates said second magnification rate from a size of said first intended area as displayed on the screen and from a size of the whole display screen.

4. An information processing apparatus for displaying at least a character or an image in a first intended area, defined by a first magnification rate, in an enlarged form at the first designated magnification rate on a screen of a display unit in a second intended area newly opened on the screen, comprising:

a detection unit detecting whether a request for opening said second intended area is issued;

a determining unit determining a second magnification rate for said second intended area that enlarges said first intended area to said second intended area from a size of the character in a first intended pre-enlarged area as displayed on the screen, and a size of the character in an area surrounding said first intended area on said display screen when said detection unit detects that a request is issued for opening said second intended area; and an enlarged display unit displaying said first intended area with said characters or said images in said first intended area on the display screen in an enlarged form within said second intended area in accordance with said second magnification rate determined by said determining unit.

5. An information processing apparatus according to claim 4, wherein said determining unit:

corrects said second magnification rate upward in the case where the size of the character displayed in said second intended area in an enlarged form in which the size of characters having been in an area surrounding said first intended area is larger than the size of the character displayed in the second intended area in an enlarged formed in which the characters having been in said first intended area according to said second magnification rate;

maintains said second magnification rate in the case where the size of the character displayed in said second intended area in the enlarged form in which the size of characters having been in an area surrounding said first intended area is equal to the size of the character displayed in the second intended area in the enlarged form in which the characters having been in said first intended area according to said second magnification rate; and corrects said second magnification rate downward in the case where the size of the character displayed in said second intended area in the enlarged form in which the size of characters having been in an area surrounding said first intended area is smaller than the size of the character displayed in the second intended area in the enlarged form in which the characters having been in said first intended area according to said second magnification rate.

6. An information processing apparatus according to claim 4, wherein:

said determining unit calculates said second magnification rate in such a manner that the size of the character displayed in said second intended area in an enlarged form in which the characters having been in an area surrounding said first intended area is equal to the size of the character displayed in the second intended area in an enlarged form in which the characters having been in said first intended area according to said second magnification rate.

7. An information processing apparatus for displaying at least a character or an image in a first intended area, defined by a first magnification rate, in an enlarged form at the first designated magnification rate on a screen of a display unit in a second intended area newly opened on the screen, comprising:

a detection unit detecting whether a request for opening said second intended area is issued;

a determining unit determining a second magnification rate of said second intended area as displayed on the screen that enlarges said first intended area to said second intended area from a size of the character in said first intended pre-enlarged area as displayed on the screen, and a specified character size when said detection unit detects that a request is issued for opening said second intended area; and an enlarged display unit displaying said first intended area with said characters or said images in said first intended area on the display screen in an enlarged form within said second intended area in accordance with said second magnification rate determined by said determining unit.

8. An information processing apparatus according to claim 7, wherein said determining unit:

corrects said second magnification rate upward in the case where the size of the character displayed in said second intended area in an enlarged form in which the size of characters having been in an area surrounding said first intended area is larger than the size of the character displayed in the second intended area in an enlarged form in which the size of characters having been in said first intended area according to said second magnification rate;

maintains said second magnification rate in the case where the size of the character displayed in the enlarged form in which the size of characters having been in an area surrounding said first intended area is equal to the size of the character displayed in the second intended area in the enlarged form in which the characters having been in said first intended area according to said second magnification rate; and corrects said second magnification rate downward in the case where the size of the character displayed in said second intended area in the enlarged form in which the size of characters having been in an area surrounding said first intended area is smaller than the size of the character displayed in the second intended area in the enlarged form in which the characters having been in said first intended area according to said second magnification rate.

9. An information processing apparatus for displaying at least a character or an image in a first intended area, defined by a first magnification rate, in an enlarged form at the first designated magnification rate on a screen of a display unit in a second intended area newly opened on the screen, comprising:

a scrolling unit scrolling said second intended area displayed in an enlarged form in a designated scrolling direction in response to a scroll request;

a detection unit detecting whether the trailing end of said second intended area scrolled in said scrolling direction in accordance with the scrolling process by said scrolling unit has reached a state displayable on said display screen when up to an area adjacent to and surrounding said second intended area is scrolled; and a prohibition unit prohibiting said second intended window from being further scrolled in said scrolling direction by said scrolling unit in the case where said detection unit detects that the trailing end of said second intended area is in a displayable state.

10. An information processing apparatus according to claim 1, further comprising:

a memory unit storing a coordinate of at least a character or an image in said first intended area which provides a trigger of opening said second intended area and are displayed on said display screen before opening said second intended area; and a restoration unit restoring and displaying on said display screen a display state of said second intended area immediately before being opened on the basis of the coordinate stored in said memory unit when erasing said second intended area.

11. A recording medium readable by a computer and having recorded therein a program used for realizing an information processing apparatus for displaying at least a character or an image in a first intended area defined by a first magnification rate in an enlarged form at the first designated magnification rate on a screen of a display unit in a second intended area newly opened on the screen, said information processing apparatus comprising:

a detection unit detecting whether a request for opening said second intended area is issued;

a determining unit determining a second magnification rate for said second intended area that enlarges said first intended area to said second intended area from a size of a first intended pre-enlarged area as displayed on the screen, and a size assigned to a second intended afterenlarged area to be displayed on the screen when said detection unit detects that a request is issued for opening said second intended area; and an enlarged display unit displaying said first intended area with said characters or said images in the area on the display screen in an enlarged form within said second intended area in accordance with said second magnification rate determined by said determining unit.

12. A recording medium readable by a computer and having recorded therein a program used for realizing an information processing apparatus for displaying at least a character or an image in a first intended area defined by a first magnification rate in an enlarged form at the first designated magnification rate on a screen of a display unit in a second intended area newly opened on the screen, said information processing apparatus comprising:

a detection unit detecting whether a request for opening said second intended area is issued;

a determining unit determining a second magnification rate of said second intended area that enlarges said first intended area to said second intended area from a size of a character in said first intended pre-enlarged area as displayed on the screen, and a size of the character in an area surrounding said first intended area on said display screen when said detection unit detects that a request is issued for opening said second intended area; and an enlarged display unit displaying said first intended area with the characters or the images in said first intended area on the display screen in the enlarged form within said second intended area in accordance with said second magnification rate determined by said determining unit.

13. A recording medium readable by a computer and having recorded therein a program used for realizing an information processing apparatus for displaying at least a character or an image in a first intended area defined by a first magnification rate in an enlarged form at the first designated magnification rate on a screen of a display unit in a second intended area newly opened on the screen, said information processing apparatus comprising:

a detection unit detecting whether a request for opening said second intended area is issued;

a determining unit determining a second magnification rate of said second intended area as displayed on the screen, that enlarges said first intended area to said second intended area from a size of the character in said first intended pre-enlarged area as displayed on the screen, and a specified character size when said detection unit detects that a request for opening said second intended area is issued; and an enlarged display unit displaying said first intended area with the characters or images in said first intended area on the display screen in an enlarged form within said second intended area in accordance with said second magnification rate determined by said determining unit.

14. A recording medium readable by a computer and having recorded therein a program used for realizing an information processing apparatus for displaying at least a character or an image in a first intended area defined by a first magnification rate in an enlarged form at the first designated magnification rate on a screen of a display unit in a second intended area newly opened on the screen, said information processing apparatus comprising:

a scrolling unit scrolling said second intended area displayed in an enlarged form in a designated scrolling direction in response to a scroll request;

a detection unit detecting whether the trailing end of said second intended area scrolled in said scrolling direction in accordance with the scrolling process by said scrolling unit has reached a state displayable on said display screen when up to an area adjacent to and surrounding said second intended area is scrolled; and a prohibition unit prohibiting said second intended area from being further scrolled in said scrolling direction by said scrolling unit in the case where said detection unit detects that the trailing end of said second intended area is in a displayable state.

15. A recording medium readable by a computer and having recorded therein a program used for realizing said information processing apparatus according to claim 11, said information processing apparatus further comprising:

a memory unit storing a coordinate of at least a character or an image in said first intended area which provides a trigger of opening said second intended area displayed on said display screen before opening said second intended area; and a restoration unit restoring and displaying on said display screen a display state of said second intended area immediately before being opened on the basis of the coordinate stored in said memory unit when erasing said second intended area.

16. An information processing apparatus according to claim 2, further comprising:

a memory unit storing a coordinate of at least a character or an image in said first intended area which provides a trigger of opening said second intended area and are displayed on said display screen before opening said second intended area; and a restoration unit restoring and displaying on said display screen a display state of said second intended area immediately before being opened on the basis of the coordinate stored in said memory unit when erasing said second intended area.

17. An information processing apparatus according to claim 3, further comprising:

a memory unit storing a coordinate of at least a character or an image in said first intended area which provides a trigger of opening said second intended area and are displayed on said display screen before opening said second intended area; and a restoration unit restoring and displaying on said display screen a display state of said second intended area immediately before being opened on the basis of the coordinate stored in said memory unit when erasing said second intended area.

18. An information processing apparatus according to claim 4, further comprising:

a memory unit storing a coordinate of at least a character or an image in said first intended area which provides a trigger of opening said second intended area and are displayed on said display screen before opening said second intended area; and a restoration unit restoring and displaying on said display screen a display state of said second intended area immediately before being opened on the basis of the coordinate stored in said memory unit when erasing said second intended area.

19. An information processing apparatus according to claim 5, further comprising:

a memory unit storing a coordinate of at least a character or an image in said first intended area which provides a trigger of opening said second intended area and are displayed on said display screen before opening said second intended area; and a restoration unit restoring and displaying on said display screen a display state of said second intended area immediately before being opened on the basis of the coordinate stored in said memory unit when erasing said second intended area.

20. An information processing apparatus according to claim 6, further comprising:

a memory unit storing a coordinate of at least a character or an image in said first intended area which provides a trigger of opening said second intended area and are displayed on said display screen before opening said second intended area; and a restoration unit restoring and displaying on said display screen a display state of said second intended area immediately before being opened on the basis of the coordinate stored in said memory unit when erasing said second intended area.

21. An information processing apparatus according to claim 7, further comprising:

a memory unit storing a coordinate of at least a character or an image in said first intended area which provides a trigger of opening said second intended area and are displayed on said display screen before opening said second intended area; and a restoration unit restoring and displaying on said display screen a display state of said second intended area immediately before being opened on the basis of the coordinate stored in said memory unit when erasing said second intended area.

22. An information processing apparatus according to claim 8, further comprising:

a memory unit storing a coordinate of at least a character or an image in said first intended area which provides a trigger of opening said second intended area and are displayed on said display screen before opening said second intended area; and a restoration unit restoring and displaying on said display screen a display state of said second intended area immediately before being opened on the basis of the coordinate stored in said memory unit when erasing said second intended area.

23. An information processing apparatus according to claim 9, further comprising:

a memory unit storing a coordinate of at least a character or an image in said first intended area which provides a trigger of opening said second intended area and are displayed on said display screen before opening said second intended area; and a restoration unit restoring and displaying on said display screen a display state of said second intended area immediately before being opened on the basis of the coordinate stored in said memory unit when erasing said second intended area.

24. A recording medium readable by a computer and having recorded therein a program used for realizing said information processing apparatus according to claim 12, said information processing apparatus comprising:

a memory unit storing a coordinate of at least a character or an image in said first intended area which provides a trigger of opening said second intended area displayed on said display screen before opening said second intended area; and a restoration unit restoring and displaying on said display screen a display state of said second intended area immediately before being opened on the basis of the coordinate stored in said memory unit when erasing said second intended area.

25. A recording medium readable by a computer and having recorded therein a program used for realizing said information processing apparatus according to claim 13, said information processing apparatus comprising:

a memory unit storing a coordinate of at least a character or an image in said first intended area which provides a trigger of opening said second intended area displayed on said display screen before opening said second intended area; and a restoration restoring and displaying on said display screen a display state of said second intended area immediately before being opened on the basis of the coordinate stored in said memory unit when erasing said second intended area.

26. A recording medium readable by a computer and having recorded therein a program used for realizing said information processing apparatus according to claim 14, said information processing apparatus comprising:

a memory unit storing a coordinate of at least a character or an image in said first intended area which provides a trigger of opening said second intended area displayed on said display screen before opening said second intended area; and a restoration unit restoring and displaying on said display screen a display state of said second intended area immediately before being opened on the basis of the coordinate stored in said memory unit when erasing said second intended area.

27. A method, comprising:

transforming a size and a scale of an original view with an original position, responsive to a magnification ratio, into a resealed and resized second view, where the second view may extend beyond a viewable border of a display;

selecting a region within the second view, where the region may extend beyond the viewable border of the display;

capturing an original character size of a character associated with the region;

detecting an opening of a window containing the region, where the window may extend beyond the viewable border of the display;

adjusting the magnification ratio responsive to a user preference; and resealing, resizing, and displaying the window responsive to a user preference, the character size, the magnification ratio, and a display size.

28. A method as recited in claim 27, further comprising allowing the user to again initiate the selecting, capturing, detecting, adjusting, and resealing.

29. A method as recited in claim 27, wherein the window is resized, resealed, displayed, and repositioned where the window horizontally and vertically exactly occupies the display.

30. A method as recited in claim 27, wherein the window is resized, resealed, and displayed such that the size of a character within the resized, rescaled, and displayed window equals the original character size.

31. A method as recited in claim 27, wherein the magnification ratio is set to a ratio of the original character size to a user specified character size, and the window is resized, rescaled, and displayed according to the magnification ratio and the size of a character in the resized, resealed, and displayed window equally the user specified character size.

32. A method as recited in claim 27, further comprising inhibiting scrolling of the second view, when the second view extends beyond the viewable border of the display, with only contents of the original view being scrolled into view.

33. A method as recited in claim 27, further comprising restoring the original view to the original position after leaving the resized and resealed second view.

34. A method as recited in claim 28, further comprising restoring the original view to the original position when leaving the resized and resealed second view, such second view having resulted from an iteration caused by the user again initiating the selecting, capturing, detecting, adjusting, and resealing.

35. An apparatus as recited in claim 1, further comprising allowing the user to again initiate the detecting, determining, enlarging, and displaying.

36. An apparatus as recited in claim 1, wherein the opening originates externally.

37. An information processing apparatus for displaying at least a character or an image in a first window at a first magnification rate, in a magnified screen area according to the first magnification rate on a screen of a display unit in a second window newly opened on the screen, comprising:

a detection unit detecting a request for opening said second window;

a determining unit automatically determining a second magnification rate that re-magnifies said first window to said second window, from a size of the first window magnified according to the first magnification rate and an unmagnified size of the second window on the screen, when said detection unit detects the request for opening said second window; and a display unit automatically displaying said first window with said characters or said images in the magnified screen area in accordance with said second magnification rate determined by said determining unit.

38. An information processing apparatus according to claim 37, wherein said determining unit:

corrects said second magnification rate upward in proportion to the difference between sizes of said first and second windows in the case where a size of said second window as displayed on the screen is larger than a size of said first window;

maintains said second magnification rate as it is in the case where the size of said second window as displayed on the screen is equal to the size of said first window; and corrects said second magnification rate downward in proportion to the difference between the sizes of said first and second windows in the case where the size of said second window as displayed on an enlarged screen is smaller than the size of said first window.

39. An information processing apparatus according to claim 38, further comprising:

a memory unit storing a coordinate of at least a character or image in said first window, where said first window which provides a trigger of opening said second window and is displayed on said display screen before opening said second window; and a restoration unit restoring and displaying on said display screen a display state immediately before the said second window being opened, where the restoring is based, the coordinate stored in said memory unit when erasing said second window.

40. An information processing apparatus according to claim 37, wherein:

said determining unit calculates said second magnification rate from a size of said first window as displayed on the screen and from a size of the whole display screen.

41. An information processing apparatus according to claim 40, further comprising:

a memory unit storing a coordinate of at least a character or image in said first window, where said first window which provides a trigger of opening said second window and is displayed on said display screen before opening said second window; and a restoration unit restoring and displaying on said display screen a display state immediately before the said second window being opened, where the restoring is based, the coordinate stored in said memory unit when erasing said second window.

42. An information processing apparatus according to claim 37, further comprising:

a memory unit storing a coordinate of at least a character or image in said first window, where said first window which provides a trigger of opening said second window and is displayed on said display screen before opening said second window; and a restoration unit restoring and displaying on said display screen a display state immediately before the said second window being opened, where the restoring is based on the coordinate stored in said memory unit when erasing said second window.

43. An information processing apparatus for displaying at least a character or an image in a first window at a first magnification rate, in a magnified screen area according to the first magnification rate on a screen of a display unit in a second window newly opened on the screen, comprising:

a detection unit automatically detecting a request for opening said second window;

a determining unit automatically determining a second magnification rate that re-magnifies said first window to said second window, from a size of the character in the first window magnified according to the first magnification rate and a size of the character in an area surrounding said first window on said display screen when said detection unit detects the request for opening said second window; and an enlarged display unit displaying said first window with said characters or said images in said magnified screen area in accordance with said second magnification rate determined by said determining unit.

44. An information processing apparatus according to claim 43, wherein said determining unit:

corrects said second magnification rate upward in the case where the size of the character displayed in said second window in an enlarged form in which the size of characters having been in an area surrounding said first window is larger than the size of the character displayed in the second window in an enlarged formed and in which the characters having been in said first window according to said second magnification rate;

maintains said second magnification rate in the case where the size of the character displayed in said second window in the enlarged form in which the size of characters having been in an area surrounding said first window is equal to the size of the character displayed in the second window in the enlarged form in which the characters having been in said first window according to said second magnification rate; and corrects said second magnification rate downward in the case where the size of the character displayed in said second window in the enlarged form in which the size of characters having been in an area surrounding said first window is smaller than the size of the character displayed in the second window in the enlarged form in which the characters having been in said first window according to said second magnification rate.

45. An information processing apparatus according to claim 44, further comprising:
  a memory unit storing a coordinate of at least a character or image in said first window, where said first window which provides a trigger of opening said second window and is displayed on said display screen before opening said second window; and
  a restoration unit restoring and displaying on said display screen a display state immediately before the said second window being opened, where the restoring is based, the coordinate stored in said memory unit when erasing said second window.

46. An information processing apparatus according to claim 43, wherein:
  said determining unit calculates said second magnification rate in such a manner that the size of the character displayed in said second window in an enlarged form in which the characters having been in an area surrounding said first window is equal to the size of the character displayed in the second window in an enlarged form in which the characters having been in said first window according to said second magnification rate.

47. An information processing apparatus according to claim 46, further comprising:
  a memory unit storing a coordinate of at least a character or image in said first window, where said first window which provides a trigger of opening said second window and is displayed on said display screen before opening said second window; and
  a restoration unit restoring and displaying on said display screen a display state immediately before the said second window being opened, where the restoring is based, the coordinate stored in said memory unit when erasing said second window.

48. An information processing apparatus according to claim 43, further comprising:
  a memory unit storing a coordinate of at least a character or image in said first window, where said first window which provides a trigger of opening said second window and is displayed on said display screen before opening said second window; and
  a restoration unit restoring and displaying on said display screen a display state immediately before the said second window being opened, where the restoring is based, the coordinate stored in said memory unit when erasing said second window.

49. An information processing apparatus for displaying at least a character or an image in a first window at a first magnification rate, in a magnified screen area according to the first magnification rate on a screen of a display unit in a second window newly opened on the screen, comprising:
  a detection unit automatically detecting a request for opening said second window;
  a determining unit automatically determining a second magnification rate that re-magnifies said first window to said second window from a size of the character in said first window magnified according to the first magnification rate and a specified character size when said detection unit detects the request for opening said second window; and
  an enlarged display unit displaying said first window with said characters or said images in said first window on the display screen in an enlarged form within said second window in accordance with said second magnification rate determined by said determining unit.

50. An information processing apparatus according to claim 49, wherein said determining unit:
  corrects said second magnification rate upward in the case where the size of the character displayed in said second window in an enlarged form in which the size of characters having been in an area surrounding said first window is larger than the size of the character displayed in the second window in an enlarged form in which the size of characters having been in said first window according to said second magnification rate;
  maintains said second magnification rate in the case where the size of the character displayed in the enlarged form in which the size of characters having been in an area surrounding said first window is equal to the size of the character displayed in the second window in the enlarged form in which the characters having been in said first window according to said second magnification rate; and
  corrects said second magnification rate downward in the case where the size of the character displayed in said second window in the enlarged form in which the size of characters having been in an area surrounding said first window is smaller than the size of the character displayed in the second window in the enlarged form in which the characters having been in said first window according to said second magnification rate.

51. An information processing apparatus according to claim 50, further comprising:
  a memory unit storing a coordinate of at least a character or image in said first window, where said first window which provides a trigger of opening said second window and is displayed on said display screen before opening said second window; and
  a restoration unit restoring and displaying on said display screen a display state immediately before the said second window being opened, where the restoring is based, the coordinate stored in said memory unit when erasing said second window.

52. An information processing apparatus according to claim 49, further comprising:
  a memory unit storing a coordinate of at least a character or image in said first window, where said first window which provides a trigger of opening said second window and is displayed on said display screen before opening said second window; and
  a restoration unit restoring and displaying on said display screen a display state immediately before the said second window being opened, where the restoring is based, the coordinate stored in said memory unit when erasing said second window.

53. An information processing apparatus for displaying at least a character or an image in a first window at a first magnification rate, in a magnified screen area according to the first magnification rate on a screen of a display unit in a second window newly opened on the screen, comprising:
  a scrolling unit scrolling said second window displayed in an enlarged form in a designated scrolling direction in response to a scroll request;
  a detection unit detecting whether a trailing end, of said second window scrolled in said scrolling direction in accordance with the scrolling process by said scrolling unit, has reached a state displayable on said display screen when up to an area adjacent to and surrounding said second window is scrolled; and
  a prohibition unit prohibiting said second window from being further scrolled in said scrolling direction by said scrolling unit in the case where said detection unit detects that the trailing end of said second window is in a displayable state.

54. An information processing apparatus according to claim 53, further comprising:
- a memory unit storing a coordinate of at least a character or image in said first window, where said first window which provides a trigger of opening said second window and is displayed on said display screen before opening said second window; and
- a restoration unit restoring and displaying on said display screen a display state immediately before the said second window being opened, where the restoring is based, the coordinate stored in said memory unit when erasing said second window.

55. A recording medium readable by a computer and having recorded therein a program used for realizing an information processing apparatus for displaying at least a character or an image in a first window at a first magnification rate in a magnified screen area according to the first magnification rate on a screen of a display unit in a second window newly opened on the screen, said information processing apparatus comprising:
- a detection unit detecting a request for opening said second window;
- a determining unit automatically determining a second magnification rate that re-magnifies said first window to said second window, from a size of the first window magnified according to the first magnification rate and an unmagnified size of the second window on the screen, when said detection unit detects the request for opening said second window; and
- a display unit automatically displaying said first window with said characters or said images in the magnified screen area in accordance with said second magnification rate determined by said determining unit.

56. A recording medium readable by a computer and having recorded therein a program used for realizing said information processing apparatus according to claim 55, said information processing apparatus further comprising:
- a memory unit storing a coordinate of at least a character or image in said first window, where said first window which provides a trigger of opening said second window and is displayed on said display screen before opening said second window; and
- a restoration unit restoring and displaying on said display screen a display state immediately before the said second window being opened, where the restoring is based, the coordinate stored in said memory unit when erasing said second window.

57. A recording medium readable by a computer and having recorded therein a program used for realizing an information processing apparatus for displaying at least a character or an image in a first window at a first magnification rate in a magnified screen area according to the first magnification rate on a screen of a display unit in a second window newly opened on the screen, said information processing apparatus comprising:
- a detection unit automatically detecting a request for opening said second window;
- a determining unit automatically determining a second magnification rate that re-magnifies said first window to said second window, from a size of the character in the first window magnified according to the first magnification rate and a size of the character in an area surrounding said first window on said display screen when said detection unit detects the request for opening said second window; and
- an enlarged display unit displaying said first window with said characters or said images in said magnified screen area in accordance with said second magnification rate determined by said determining unit.

58. A recording medium readable by a computer and having recorded therein a program used for realizing said information processing apparatus according to claim 57, said information processing apparatus comprising:
- a memory unit storing a coordinate of at least a character or image in said first window, where said first window which provides a trigger of opening said second window and is displayed on said display screen before opening said second window; and
- a restoration unit restoring and displaying on said display screen a display state immediately before the said second window being opened, where the restoring is based, the coordinate stored in said memory unit when erasing said second window.

59. A recording medium readable by a computer and having recorded therein a program used for realizing an information processing apparatus for displaying at least a character or an image in a first window at a first magnification rate in a magnified screen area according to the first magnification rate on a screen of a display unit in a second window newly opened on the screen, said information processing apparatus comprising:
- a detection unit automatically detecting a request for opening said second window;
- a determining unit automatically determining a second magnification rate that re-magnifies said first window to said second window from a size of the character in said first window magnified according to the first magnification rate and a specified character size when said detection unit detects the request for opening said second window; and
- an enlarged display unit displaying said first window with said characters or said images in said first window on the display screen in an enlarged form within said second window in accordance with said second magnification rate determined by said determining unit.

60. A recording medium readable by a computer and having recorded therein a program used for realizing said information processing apparatus according to claim 59, said information processing apparatus comprising:
- a memory unit storing a coordinate of at least a character or image in said first window, where said first window which provides a trigger of opening said second window and is displayed on said display screen before opening said second window; and
- a restoration unit restoring and displaying on said display screen a display state immediately before the said second window being opened, where the restoring is based, the coordinate stored in said memory unit when erasing said second window.

61. A recording medium readable by a computer and having recorded therein a program used for realizing an information processing apparatus for displaying at least a character or an image in a first window at a first magnification rate in a magnified screen area according to the first magnification rate on a screen of a display unit in a second window newly opened on the screen, said information processing apparatus comprising:
- a scrolling unit scrolling said second window displayed in an enlarged form in a designated scrolling direction in response to a scroll request;

a detection unit detecting whether a trailing end, of said second window scrolled in said scrolling direction in accordance with the scrolling process by said scrolling unit, has reached a state displayable on said display screen when up to an area adjacent to and surrounding said second window is scrolled; and a prohibition unit prohibiting said second window from being further scrolled in said scrolling direction by said scrolling unit in the case where said detection unit detects that the trailing end of said second window is in a displayable state.

62. A recording medium readable by a computer and having recorded therein a program used for realizing said information processing apparatus according to claim 61, said information processing apparatus comprising:

a memory unit storing a coordinate of at least a character or image in said first window, where said first window which provides a trigger of opening said second window and is displayed on said display screen before opening said second window; and a restoration unit restoring and displaying on said display screen a display state immediately before the said second window being opened, where the restoring is based, the coordinate stored in said memory unit when erasing said second window.

63. A method, comprising:

transforming a size and a scale of an original first magnified view with an original position, magnified at a magnification ratio, into a second magnified view;

selecting a first window within the first magnified view;

capturing a displayed character size of a character displayed in the first window in the first view;

detecting, while in the first magnified view, an opening of a second window, where the second window, if displayed in the first magnified view, would one of extend beyond a viewable border of the the first magnified view and have a character size smaller than the captured character size;

adjusting the magnification ratio such that the second window, when magnified and displayed in the second magnified view according to the adjusted magnification ratio, one of fits within the second magnified view and has a character size comparable to the captured character size; and displaying the second view having the first and second windows according to the adjusted magnification ratio.

64. A method as recited in claim 63, further comprising allowing the user to again initiate the selecting, capturing, detecting, adjusting, and resealing.

65. A method as recited in claim 64, further comprising restoring the original view to the original position when leaving the resized and resealed second view, such second view having resulted from an iteration caused by the user again initiating the selecting, capturing, detecting, adjusting, and resealing.

66. A method as recited in claim 63, wherein the window is resized, rescaled, displayed, and repositioned where the window horizontally and vertically exactly occupies the display.

67. A method as recited in claim 63, wherein the window is resized, rescaled, and displayed such that the size of a character within the resized, resealed, and displayed window equals the original character size.

68. A method as recited in claim 63, wherein the magnification ratio is set to a ratio of the original character size to a user specified character size, and the window is resized, rescaled, and displayed according to the magnification ratio and the size of a character in the resized, resealed, and displayed window equally the user specified character size.

69. A method as recited in claim 63, further comprising inhibiting scrolling of the second view, when the second view extends beyond the viewable border of the display, with only contents of the original view being scrolled into view.

70. A method as recited in claim 63, further comprising restoring the original view to the original position after leaving the resized and resealed second view.

\* \* \* \* \*

UNITED STATES PATENT AND TRADEMARK OFFICE
CERTIFICATE OF CORRECTION

| | | |
|---|---|---|
| PATENT NO. | : 6,968,502 B1 | Page 1 of 1 |
| APPLICATION NO. | : 08/938706 | |
| DATED | : November 22, 2005 | |
| INVENTOR(S) | : Keisuke Kubomura et al. | |

It is certified that error appears in the above-identified patent and that said Letters Patent is hereby corrected as shown below:

Column 18, Line 1, after "restoration" insert - - unit - -.
Column 18, Line 24, delete "resealed" and insert - - rescaled - - therefor.
Column 18, Line 37, delete "resealing" and insert - - rescaling - - therefor.
Column 18, Line 42, delete "resealing" and insert - - rescaling - - therefor.
Column 18, Line 44, delete "resealed" and insert - - rescaled - - therefor.
Column 18, Line 48, delete "resealed" and insert - - rescaled - - therefor.
Column 18, Line 55, delete "resealed" and insert - - rescaled - - therefor.
Column 18, Line 64, delete "resealed" and insert - - rescaled - - therefor.
Column 18, Line 67, delete "resealed" and insert - - rescaled - - therefor.
Column 19, Line 3, delete "resealing" and insert - - rescaling - - therefor.
Column 20, Line 49, delete "formed" and insert - - form - - therefor.
Column 25, Line 37, delete "the" (second occurrence).
Column 26, Line 10, delete "resealing" and insert - - rescaling - - therefor.
Column 26, Line 13, delete "resealed" and insert - - rescaled - - therefor.
Column 26, Line 16, delete "resealing" and insert - - rescaling - - therefor.
Column 26, Line 24, delete "resealed" and insert - - rescaled - - therefor.
Column 26, Line 30, delete "resealed" and insert - - rescaled - - therefor.
Column 26, Line 39, delete "resealed" and insert - - rescaled - - therefor.

Signed and Sealed this

Twenty-second Day of August, 2006

JON W. DUDAS
*Director of the United States Patent and Trademark Office*